United States Patent
Chardon et al.

(10) Patent No.: US 9,239,837 B2
(45) Date of Patent: Jan. 19, 2016

(54) REMOTE CONTROL SYSTEM FOR CONNECTED DEVICES

(75) Inventors: Jean-Michel Chardon, Toronto (CA); Mark Connolly, Toronto (CA); Steven Heintz, Palo Alto, CA (US); Ian Crowe, Toronto (CA); Ashish Arora, Los Altos, CA (US); Adrien Lazzaro, Fremont, CA (US)

(73) Assignee: Logitech Europe S.A., Lausanne (CH)

( * ) Notice: Subject to any disclaimer, the term of this patent is extended or adjusted under 35 U.S.C. 154(b) by 657 days.

(21) Appl. No.: 13/284,668

(22) Filed: Oct. 28, 2011

(65) Prior Publication Data

US 2012/0274863 A1 Nov. 1, 2012

Related U.S. Application Data

(60) Provisional application No. 61/480,849, filed on Apr. 29, 2011.

(51) Int. Cl.
*G05B 11/01* (2006.01)
*G08C 19/16* (2006.01)
(Continued)

(52) U.S. Cl.
CPC ...... *G06F 17/30011* (2013.01); *G06F 3/04886* (2013.01); *G06F 17/30017* (2013.01); *H04N 21/4222* (2013.01); *H04N 21/42209* (2013.01); *H04N 21/42224* (2013.01); *H04N 21/4312* (2013.01); *G06F 17/30026* (2013.01); *G06F 17/3074* (2013.01); *G06F 17/30781* (2013.01);
(Continued)

(58) Field of Classification Search
CPC ............. G06F 3/02; G06F 13/00; G09G 5/00; G08C 19/12; G08C 19/00; H04L 17/02; H04N 7/173; H04N 5/44; H04N 7/16; H04N 7/18; G05B 11/01

USPC ....................................... 340/12.26
See application file for complete search history.

(56) References Cited

U.S. PATENT DOCUMENTS 3,990,012 A  11/1976 Karnes
4,174,517 A  11/1979 Mandel
(Continued)

FOREIGN PATENT DOCUMENTS

CN  1399444 A  2/2003
CN  1434422 A  8/2003
(Continued)

OTHER PUBLICATIONS

Ciarcia, S., "Build a Trainable Infrared Master Controller," *Byte*, 12(3):113-123 (1987).
(Continued)

*Primary Examiner* — Jennifer Mehmood
*Assistant Examiner* — John Mortell
(74) *Attorney, Agent, or Firm* — Kilpatrick Townsend & Stockton LLP

(57) ABSTRACT

Systems and methods utilize a display to provide universal remote control functionality. A menu of options appears on a display of a display device. A user can navigate the various options to control devices that are separate from the display device. The menu may be dynamically configured according to the context in which the display device is being used. The menu may be activated using a remote control device or other device and the menu may include options for controlling one or more devices that are absent from the remote control device.

33 Claims, 13 Drawing Sheets

(51) Int. Cl.
*G06F 3/02* (2006.01)
*G06F 17/30* (2006.01)
*G06F 3/0488* (2013.01)
*H04N 21/422* (2011.01)
*H04N 21/431* (2011.01)
*H04N 21/478* (2011.01)
*H04N 21/4782* (2011.01)
*H04N 21/4786* (2011.01)

(52) U.S. Cl.
CPC ........ *H04N 21/4781* (2013.01); *H04N 21/4782* (2013.01); *H04N 21/4786* (2013.01)

(56) References Cited

U.S. PATENT DOCUMENTS

| | | | |
|---|---|---|---|
| 4,394,691 A | 7/1983 | Amano et al. | |
| 4,488,179 A | 12/1984 | Kruger et al. | |
| 4,566,034 A | 1/1986 | Harger et al. | |
| 4,626,848 A | 12/1986 | Ehlers | |
| 4,774,511 A | 9/1988 | Rumbolt et al. | |
| 4,837,627 A | 6/1989 | Mengel | |
| 4,918,439 A | 4/1990 | Wozniak et al. | |
| 4,959,810 A | 9/1990 | Darbee et al. | |
| 5,109,222 A | 4/1992 | Welty | |
| 5,140,326 A | 8/1992 | Bacrania et al. | |
| 5,161,023 A | 11/1992 | Keenan | |
| 5,177,461 A | 1/1993 | Budzyna et al. | |
| 5,228,077 A | 7/1993 | Darbee | |
| 5,255,313 A | 10/1993 | Darbee | |
| 5,272,418 A | 12/1993 | Howe et al. | |
| 5,367,316 A * | 11/1994 | Ikezaki | 345/158 |
| 5,374,999 A | 12/1994 | Chuang et al. | |
| 5,410,326 A | 4/1995 | Goldstein | |
| 5,414,426 A | 5/1995 | O'Donnell et al. | |
| 5,414,761 A | 5/1995 | Darbee | |
| 5,422,783 A | 6/1995 | Darbee | |
| 5,481,251 A | 1/1996 | Buys et al. | |
| 5,481,256 A | 1/1996 | Darbee et al. | |
| 5,515,052 A | 5/1996 | Darbee | |
| 5,517,257 A * | 5/1996 | Dunn et al. | 348/734 |
| 5,537,463 A | 7/1996 | Escobosa et al. | |
| 5,552,917 A | 9/1996 | Darbee et al. | |
| 5,568,367 A | 10/1996 | Park | |
| 5,579,221 A | 11/1996 | Mun | |
| 5,614,906 A | 3/1997 | Hayes et al. | |
| 5,619,196 A | 4/1997 | Escobosa | |
| 5,629,868 A | 5/1997 | Tessier et al. | |
| 5,638,050 A | 6/1997 | Sacca et al. | |
| 5,671,267 A | 9/1997 | August et al. | |
| 5,677,711 A | 10/1997 | Kuo | |
| 5,686,891 A | 11/1997 | Sacca et al. | |
| 5,689,353 A | 11/1997 | Darbee et al. | |
| 5,778,256 A | 7/1998 | Darbee | |
| 5,907,322 A | 5/1999 | Kelly et al. | |
| 5,943,228 A | 8/1999 | Kim | |
| 5,949,351 A | 9/1999 | Hahm | |
| 5,953,144 A | 9/1999 | Darbee et al. | |
| 5,959,751 A | 9/1999 | Darbee et al. | |
| 5,963,145 A | 10/1999 | Escobosa | |
| 6,002,450 A | 12/1999 | Darbee et al. | |
| 6,014,092 A | 1/2000 | Darbee et al. | |
| 6,073,374 A | 6/2000 | Tingmo | |
| 6,097,309 A | 8/2000 | Hayes et al. | |
| 6,097,441 A | 8/2000 | Allport | |
| 6,104,334 A | 8/2000 | Allport | |
| 6,130,625 A | 10/2000 | Harvey | |
| 6,130,726 A | 10/2000 | Darbee et al. | |
| 6,133,847 A | 10/2000 | Yang | |
| 6,147,677 A | 11/2000 | Escobosa et al. | |
| 6,154,204 A | 11/2000 | Thompson et al. | |
| 6,157,319 A | 12/2000 | Johns et al. | |
| 6,169,451 B1 | 1/2001 | Kim | |
| 6,173,330 B1 | 1/2001 | Guo et al. | |
| 6,177,931 B1 | 1/2001 | Alexander et al. | |
| 6,195,033 B1 | 2/2001 | Darbee et al. | |
| 6,211,870 B1 | 4/2001 | Foster | |
| 6,223,348 B1 | 4/2001 | Hayes et al. | |
| 6,225,938 B1 | 5/2001 | Hayes et al. | |
| 6,243,035 B1 | 6/2001 | Walter et al. | |
| 6,255,961 B1 | 7/2001 | Van Ryzin et al. | |
| 6,271,831 B1 | 8/2001 | Escobosa et al. | |
| 6,275,268 B1 | 8/2001 | Ellis et al. | |
| 6,278,499 B1 | 8/2001 | Darbee | |
| 6,288,799 B1 | 9/2001 | Sekiguchi | |
| 6,330,091 B1 | 12/2001 | Escobosa et al. | |
| 6,374,404 B1 | 4/2002 | Brotz et al. | |
| 6,496,135 B1 | 12/2002 | Darbee | |
| 6,522,262 B1 | 2/2003 | Hayes et al. | |
| 6,538,556 B1 | 3/2003 | Kawajiri | |
| 6,563,430 B1 | 5/2003 | Kemink et al. | |
| 6,567,011 B1 | 5/2003 | Young et al. | |
| 6,567,984 B1 | 5/2003 | Allport | |
| 6,587,067 B2 | 7/2003 | Darbee et al. | |
| 6,628,340 B1 | 9/2003 | Graczyk et al. | |
| 6,629,077 B1 | 9/2003 | Arling et al. | |
| 6,636,157 B1 * | 10/2003 | Sato | 340/12.5 |
| 6,640,144 B1 | 10/2003 | Huang et al. | |
| 6,642,852 B2 | 11/2003 | Dresti et al. | |
| 6,650,247 B1 | 11/2003 | Hayes | |
| 6,657,679 B2 | 12/2003 | Hayes et al. | |
| 6,690,290 B2 | 2/2004 | Young et al. | |
| 6,701,091 B2 | 3/2004 | Escobosa et al. | |
| 6,720,904 B1 | 4/2004 | Darbee | |
| 6,722,984 B1 | 4/2004 | Sweeney, Jr. et al. | |
| 6,724,339 B2 | 4/2004 | Conway et al. | |
| 6,747,591 B1 | 6/2004 | Lilleness et al. | |
| 6,748,248 B1 | 6/2004 | Pan et al. | |
| 6,781,518 B1 | 8/2004 | Hayes et al. | |
| 6,781,638 B1 | 8/2004 | Hayes | |
| 6,784,804 B1 | 8/2004 | Hayes et al. | |
| 6,785,579 B2 | 8/2004 | Huang et al. | |
| 6,788,241 B2 | 9/2004 | Arling et al. | |
| 6,826,370 B2 | 11/2004 | Escobosa et al. | |
| 6,829,512 B2 | 12/2004 | Huang et al. | |
| 6,847,101 B2 | 1/2005 | Ejelstad et al. | |
| 6,859,197 B2 | 2/2005 | Klein et al. | |
| 6,870,463 B2 | 3/2005 | Dresti et al. | |
| 6,882,729 B2 | 4/2005 | Arling et al. | |
| 6,885,952 B1 | 4/2005 | Hayes et al. | |
| 6,917,302 B2 | 7/2005 | Lilleness et al. | |
| 6,933,833 B1 | 8/2005 | Darbee | |
| 6,938,101 B2 | 8/2005 | Hayes et al. | |
| 6,946,988 B2 | 9/2005 | Edwards et al. | |
| 6,947,101 B2 | 9/2005 | Arling | |
| 6,968,570 B2 | 11/2005 | Hayes et al. | |
| 7,005,979 B2 | 2/2006 | Haughawout et al. | |
| 7,010,805 B2 | 3/2006 | Hayes et al. | |
| 7,013,434 B2 | 3/2006 | Masters et al. | |
| RE39,059 E | 4/2006 | Foster | |
| 7,046,161 B2 | 5/2006 | Hayes | |
| 7,079,113 B1 | 7/2006 | Hayes et al. | |
| 7,091,898 B2 | 8/2006 | Arling et al. | |
| 7,093,003 B2 | 8/2006 | Yuh et al. | |
| 7,102,688 B2 | 9/2006 | Hayes et al. | |
| 7,119,710 B2 | 10/2006 | Hayes et al. | |
| 7,126,468 B2 | 10/2006 | Arling et al. | |
| 7,129,995 B2 | 10/2006 | Arling | |
| 7,136,709 B2 | 11/2006 | Arling et al. | |
| 7,142,127 B2 | 11/2006 | Hayes et al. | |
| 7,142,934 B2 | 11/2006 | Janik | |
| 7,142,935 B2 | 11/2006 | Janik | |
| 7,143,214 B2 | 11/2006 | Hayes et al. | |
| 7,154,428 B2 | 12/2006 | Clercq et al. | |
| 7,155,305 B2 | 12/2006 | Hayes et al. | |
| 7,161,524 B2 | 1/2007 | Nguyen | |
| 7,167,765 B2 | 1/2007 | Janik | |
| 7,167,913 B2 | 1/2007 | Chanmbers | |
| 7,193,661 B2 | 3/2007 | Dresti et al. | |
| 7,200,357 B2 | 4/2007 | Janik et al. | |
| 7,209,116 B2 | 4/2007 | Gates et al. | |
| 7,218,243 B2 | 5/2007 | Hayes et al. | |
| 7,221,306 B2 | 5/2007 | Young | |
| RE39,716 E | 7/2007 | Huang et al. | |

(56) References Cited

U.S. PATENT DOCUMENTS

| | | |
|---|---|---|
| 7,253,765 B2 | 8/2007 | Edwards et al. |
| 7,254,777 B2 | 8/2007 | Hayes et al. |
| 7,266,701 B2 | 9/2007 | Hayes et al. |
| 7,266,777 B2 | 9/2007 | Scott et al. |
| 7,268,694 B2 | 9/2007 | Hayes et al. |
| 7,274,303 B2 | 9/2007 | Dresti et al. |
| 7,281,262 B2 | 10/2007 | Hayes et al. |
| 7,319,409 B2 | 1/2008 | Hayes et al. |
| 7,319,426 B2 | 1/2008 | Garfio |
| 7,436,319 B1 | 10/2008 | Harris et al. |
| 7,436,346 B2 * | 10/2008 | Walter et al. ............... 341/176 |
| 7,877,328 B2 | 1/2011 | Tanaka |
| 7,944,370 B1 | 5/2011 | Harris et al. |
| 8,031,270 B1 | 10/2011 | Wisniewski et al. |
| 8,054,294 B2 * | 11/2011 | Sakai et al. ............... 345/169 |
| 8,117,590 B2 | 2/2012 | Kataoka |
| 8,281,047 B2 | 10/2012 | Yoshida et al. |
| 8,365,140 B2 | 1/2013 | Heyhoe et al. |
| 8,531,276 B2 * | 9/2013 | Harris et al. ............ 340/12.22 |
| 2002/0046083 A1 | 4/2002 | Ondeck |
| 2002/0056084 A1 | 5/2002 | Harris et al. |
| 2002/0190956 A1 | 12/2002 | Klein et al. |
| 2003/0046579 A1 | 3/2003 | Hayes et al. |
| 2003/0048295 A1 | 3/2003 | Lilleness et al. |
| 2003/0095156 A1 | 5/2003 | Klein et al. |
| 2003/0103088 A1 | 6/2003 | Dresti et al. |
| 2003/0117427 A1 | 6/2003 | Haughawout et al. |
| 2003/0151538 A1 | 8/2003 | Escobosa et al. |
| 2003/0164773 A1 | 9/2003 | Young et al. |
| 2003/0164787 A1 | 9/2003 | Dresti |
| 2003/0189509 A1 | 10/2003 | Hayes et al. |
| 2003/0193519 A1 | 10/2003 | Hayes et al. |
| 2003/0233664 A1 | 12/2003 | Huang et al. |
| 2004/0046677 A1 | 3/2004 | Dresti |
| 2004/0056789 A1 | 3/2004 | Arling et al. |
| 2004/0056984 A1 | 3/2004 | Hayes et al. |
| 2004/0070491 A1 | 4/2004 | Huang et al. |
| 2004/0093096 A1 | 5/2004 | Huang et al. |
| 2004/0117632 A1 | 6/2004 | Arling et al. |
| 2004/0136726 A1 | 7/2004 | Escobosa et al. |
| 2004/0169590 A1 | 9/2004 | Haughawout et al. |
| 2004/0169598 A1 | 9/2004 | Arling et al. |
| 2004/0189508 A1 | 9/2004 | Nguyen |
| 2004/0189509 A1 | 9/2004 | Lilleness et al. |
| 2004/0210933 A1 | 10/2004 | Dresti |
| 2004/0246165 A1 | 12/2004 | Conway et al. |
| 2004/0263349 A1 | 12/2004 | Haughawout et al. |
| 2004/0266419 A1 | 12/2004 | Arling et al. |
| 2004/0268391 A1 | 12/2004 | Clercq et al. |
| 2005/0024226 A1 | 2/2005 | Hayes et al. |
| 2005/0030196 A1 | 2/2005 | Harris et al. |
| 2005/0052423 A1 | 3/2005 | Harris et al. |
| 2005/0055716 A1 | 3/2005 | Louie et al. |
| 2005/0062614 A1 | 3/2005 | Young |
| 2005/0062636 A1 | 3/2005 | Conway et al. |
| 2005/0066370 A1 | 3/2005 | Alvarado |
| 2005/0073914 A1 | 4/2005 | Yabe |
| 2005/0078087 A1 | 4/2005 | Gates et al. |
| 2005/0080496 A1 | 4/2005 | Hayes et al. |
| 2005/0088315 A1 | 4/2005 | Klein et al. |
| 2005/0094610 A1 | 5/2005 | De Clerq et al. |
| 2005/0096753 A1 | 5/2005 | Arling et al. |
| 2005/0097618 A1 | 5/2005 | Arling et al. |
| 2005/0107966 A1 | 5/2005 | Hayes |
| 2005/0116930 A1 | 6/2005 | Gates |
| 2005/0134578 A1 | 6/2005 | Chambers et al. |
| 2005/0159823 A1 | 7/2005 | Hayes et al. |
| 2005/0162282 A1 | 7/2005 | Dresti |
| 2005/0179559 A1 | 8/2005 | Edwards et al. |
| 2005/0183104 A1 | 8/2005 | Edwards et al. |
| 2005/0195979 A1 | 9/2005 | Arling et al. |
| 2005/0200598 A1 | 9/2005 | Hayes et al. |
| 2005/0210101 A1 | 9/2005 | Janik |
| 2005/0216606 A1 | 9/2005 | Hayes et al. |
| 2005/0216843 A1 | 9/2005 | Masters et al. |
| 2005/0231649 A1 | 10/2005 | Arling |
| 2005/0258806 A1 | 11/2005 | Janik et al. |
| 2005/0280743 A1 | 12/2005 | Dresti et al. |
| 2005/0283814 A1 | 12/2005 | Scott et al. |
| 2005/0285750 A1 | 12/2005 | Hayes et al. |
| 2006/0007306 A1 | 1/2006 | Masters et al. |
| 2006/0012488 A1 | 1/2006 | Hilbrink et al. |
| 2006/0031400 A1 | 2/2006 | Yuh et al. |
| 2006/0031437 A1 | 2/2006 | Chambers |
| 2006/0031549 A1 | 2/2006 | Janik et al. |
| 2006/0031550 A1 | 2/2006 | Janik et al. |
| 2006/0050142 A1 | 3/2006 | Scott et al. |
| 2006/0055554 A1 | 3/2006 | Hayes et al. |
| 2006/0101498 A1 | 5/2006 | Arling et al. |
| 2006/0125800 A1 | 6/2006 | Janik |
| 2006/0132458 A1 | 6/2006 | Garfio et al. |
| 2006/0143572 A1 | 6/2006 | Scott et al. |
| 2006/0150120 A1 | 7/2006 | Dresti et al. |
| 2006/0161865 A1 | 7/2006 | Scott et al. |
| 2006/0194549 A1 | 8/2006 | Janik et al. |
| 2006/0200538 A1 | 9/2006 | Yuh et al. |
| 2006/0259183 A1 | 11/2006 | Hayes et al. |
| 2006/0259184 A1 | 11/2006 | Hayes et al. |
| 2006/0259864 A1 | 11/2006 | Klein et al. |
| 2006/0262002 A1 | 11/2006 | Nguyen |
| 2006/0283697 A1 | 12/2006 | Garfio |
| 2006/0288300 A1 | 12/2006 | Chambers et al. |
| 2006/0294217 A1 | 12/2006 | Chambers |
| 2007/0052547 A1 | 3/2007 | Haughawout et al. |
| 2007/0061027 A1 | 3/2007 | Janik |
| 2007/0061028 A1 | 3/2007 | Janik |
| 2007/0061029 A1 | 3/2007 | Janik |
| 2007/0063860 A1 | 3/2007 | Escobosa et al. |
| 2007/0073958 A1 | 3/2007 | Kalayjian |
| 2007/0077784 A1 | 4/2007 | Kalayjian et al. |
| 2007/0097275 A1 | 5/2007 | Dresti et al. |
| 2007/0136693 A1 | 6/2007 | Lilleness et al. |
| 2007/0156739 A1 | 7/2007 | Black et al. |
| 2007/0178830 A1 | 8/2007 | Janik et al. |
| 2007/0206949 A1 | 9/2007 | Mortensen |
| 2007/0225828 A1 | 9/2007 | Huang et al. |
| 2007/0233740 A1 | 10/2007 | Nichols et al. |
| 2007/0258595 A1 | 11/2007 | Choy |
| 2007/0271267 A1 | 11/2007 | Lim et al. |
| 2007/0279244 A1 | 12/2007 | Haughawout et al. |
| 2007/0296552 A1 | 12/2007 | Huang et al. |
| 2008/0005764 A1 | 1/2008 | Arling et al. |
| 2008/0016467 A1 | 1/2008 | Chambers et al. |
| 2008/0016468 A1 | 1/2008 | Chambers et al. |
| 2008/0042982 A1 | 2/2008 | Gates et al. |
| 2008/0184196 A1 | 7/2008 | Kataoka |
| 2008/0243698 A1 | 10/2008 | Tanaka |
| 2008/0314232 A1 | 12/2008 | Hansson et al. |
| 2009/0300580 A1 | 12/2009 | Heyhoe et al. |
| 2010/0005503 A1 | 1/2010 | Kaylor et al. |
| 2010/0169414 A1 | 7/2010 | Pavot et al. |
| 2012/0036538 A1 | 2/2012 | Kudelski et al. |
| 2012/0128334 A1 | 5/2012 | Cheok et al. |
| 2012/0249890 A1 | 10/2012 | Chardon et al. |
| 2012/0278348 A1 | 11/2012 | Chardon et al. |
| 2013/0212556 A1 | 8/2013 | Heyhoe et al. |

FOREIGN PATENT DOCUMENTS

| | | |
|---|---|---|
| EP | 103 438 A1 | 3/1984 |
| EP | 398 550 A2 | 11/1990 |
| EP | 1014577 A1 | 6/2000 |
| GB | 2081948 A | 2/1982 |
| GB | 2175724 A | 12/1986 |
| JP | 2002058079 A | 2/2002 |
| JP | 2002271871 A | 9/2002 |
| JP | 2003087881 A | 3/2003 |
| WO | WO 01/69567 A2 | 9/1991 |
| WO | WO 99/34564 A1 | 7/1999 |
| WO | WO 00/34851 A1 | 6/2000 |

(56) References Cited

FOREIGN PATENT DOCUMENTS

| WO | WO 03/045107 A1 | 5/2003 |
|----|----|----|
| WO | WO 03/060804 A1 | 7/2003 |
| WO | WO 2005/000003 A2 | 1/2005 |

OTHER PUBLICATIONS

Ciarcia, S., *The Best of Ciarcia's Circuit Cellar*, pp. 345-354 (1987).

Konstan, J. A., "State problems in programming human-controlled devices," *Digest of Tech. Papers of Int. Conf. on Consumer Electronics (ICCE)*, pp. 122-123 (1994).

Radio Shack, *Universal Remote Control Owners Manual*, pp. 1-19, (1987).

"ProntoEdit User Manual"; 2002, http://www.pronto.philips.com/index.cfm?id=241, 85 pages.

"Pronto Review"; www.remotecentral.com/pronto/index.html, 3 pages.

Press Release: "Philips Revolutionizes Home Theatre Control"; 1998, 3 pages.

Pronto link to downloadable files for components from different manufacturers; http://www.remotecentral.com/files/index.html, 3 pages.

\* cited by examiner

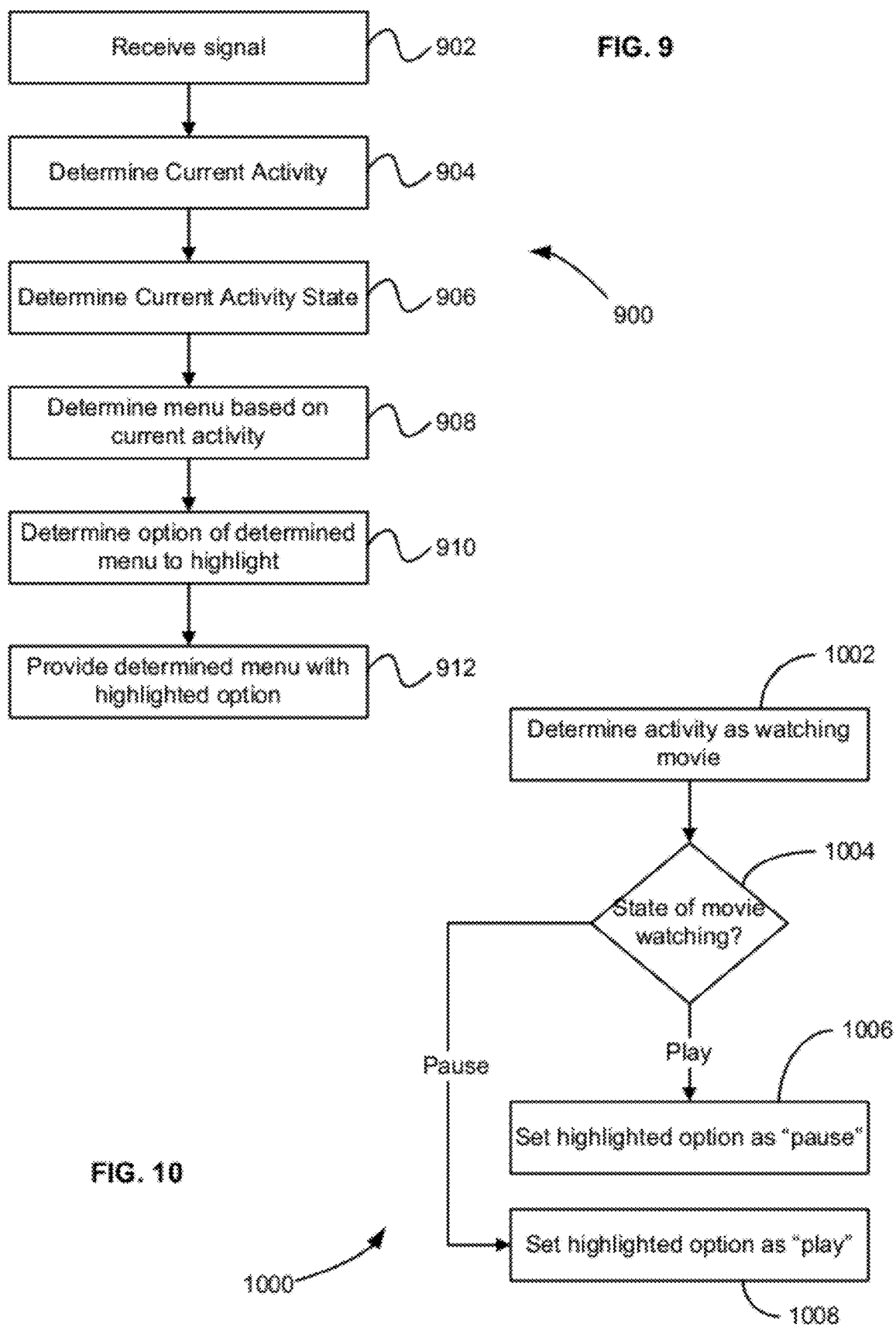

REMOTE CONTROL SYSTEM FOR CONNECTED DEVICES

CROSS REFERENCE TO RELATED APPLICATION

This application claims the benefit of provisional application No. 61/480,849, entitled "Remote Control for Connected Devices", filed on Apr. 29, 2011, the full disclosure of which is incorporated herein by reference. This application also incorporates by reference for all purposes the full disclosures of application Ser. No. 13/077,750, entitled "Apparatus and Method for Configuration and Operation of a Remote-Control System" filed on Mar. 31, 2011.

BACKGROUND OF THE INVENTION

The present invention relates generally to remote control devices and more specifically it relates to a remote control solution for devices, applications and content by combining a controller with an on-TV user interface that is adaptable to communicate with and control various devices and/or applications.

Remote control devices have been in use for many years. Remote control devices are utilized to operate various external electronic devices including but not limited to televisions, stereos, receivers, VCRs, DVD players, CD players, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (e.g. television, VCR; DVD player, etc.). Universal remote control devices allow for the control of a plurality of external electronic devices with a single remote control, thereby eliminating the need to have a plurality of remote controls physically present within a room.

Conventional universal remote controls are typically programmed using two methods: (1) entering an "identifier code" directly into the remote control, or (2) sampling the control signal transmitted by another remote control device. Neither method of programming a universal remote control is efficient and, therefore, many consumers either choose not to purchase a universal remote control or abandon the usage of an already purchased remote control.

Entering identifier codes into a remote control can be time-consuming and difficult for many users. If the user loses the "code book" that comes with the universal remote control he or she is oftentimes left with a useless universal remote control that he or she is unable to reprogram. Oftentimes a consumer is given four to eight different possible identifier codes for a particular brand of electronic device, thereby requiring the user to, through trial and error, determine the correct identifier code. Sometimes an individual believes he or she has entered the proper identifier code since one or two of the commands on the keypad work only to find out later that one or more commands do not work, with the electronic device since the proper identifier code was not entered.

Also, sampling of control signals is very time-consuming and difficult to ensure proper sampling. An individual must expend significant amounts of time sampling infrared signals from another remote control and saving these signals within the universal remote control, thereafter assigning the particular signal to a button on the keypad. This is very labor-intensive and the results are only as stable as the infrared code sampled.

There are also other problems with conventional universal remote controls that make them less desirable for consumers. For example, many universal remote controls have a large number of buttons, many of which may never be used, since the manufacturers attempt to have physical buttons for each possible command of each possible electronic device. Additionally, even when large numbers of buttons are included in the remote, the programming and compatibility of the remote with new devices are often limited.

Another problem with conventional universal remote controls is that the electronic components within these devices are relatively complex and expensive to manufacture, resulting in an increased cost to the consumer.

While these devices may be suitable for the particular purpose to which they are addressed, from the perspectives of cost, ease of use, and expandability, they are not optimal. Accordingly, there exist ongoing needs to provide remote control systems that can be applied to multiple devices in a more intuitive and expandable manner.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In view of the foregoing disadvantages inherent in the known types of universal remote controls now present in the prior art, the present invention provides a remote control system that uses microprocessor and communication functions onboard a display device, such as a television (TV), to allow a user to control multiple devices via a user interface (UI) presented by the display device. This may be accomplished, for example, using a relatively low-cost remote control that operates the TV, or the like, and provides minimal UI navigation functionality.

Objects of the invention may include the delivery of a full universal remote control solution for devices, applications and content at minimum cost by combining an on-TV UI with a dedicated controller or a standard TV remote with at least one button that is operable to access the on-TV UI. In some embodiments, the on-TV UI may be accessed in other ways, such as through an application executing on a mobile device or tablet computing device.

Aspects of the invention may reduce controller complexity by off-loading functionality to an on-TV overlay as well as reduce usage complexity by applying contextual awareness to provide the most relevant options to the user.

According to first aspects of the invention, a remote control system is provided including a display device with a video display, a processor configured to interact with a remote control, and a communication apparatus configured for communicating with one or more other devices. In embodiments, the display device may be, for example, a TV including a tuner, audio-visual (AV), high-definition multimedia interface (HDMI), and/or separate video (S-Video) inputs, and, generally, any interface for communicating with another device. The display device may also include wireless communication capabilities, such as WI-FI, BlueTooth, and other capabilities. The display device may also support various web-streaming and web browsing modes and, generally, may receive information over a physical wire, fiber optic cable, wirelessly, and/or otherwise.

In embodiments, the processor of the display device may be configured, by programming instructions and the like, to present a user interface (UI) including selectable commands on the display based on capabilities of one or more other devices. The display device may be configured to receive commands for the other device(s) from a remote control; and to communicate the received commands to the one or more other devices. In an embodiment, memory of the display device includes instructions executable by the processor that cause the display device to modify its display according to various embodiments of the present invention.

In embodiments, the processor of the display device may be further configured to change the selectable commands based on a current mode of operation of the display device, e.g. tuner, AV, HDMI, S-Video, web-streaming, and web browsing modes.

In embodiments, the display device may include selectable modes of operation including at least three of tuner, AV, HDMI, S-Video, web-streaming, and web browsing modes. Embodiments may include changing the selectable commands based on a current mode of operation of the display device and/or displaying different selectable commands in the UI based on the at least three modes of operation. In embodiments, for example, different selectable commands may be displayed in the user interface based on the at least three modes of operation.

In embodiments, the processor of the display device may be configured to recognize a first command received from the remote control, and actions taken by the processor in response to the first command may be changed from a first set of actions to a second set of actions including at least one different action from the first set of actions. In embodiments, the first command may be, for example, a display ON command, the first set of actions may turn the display ON, and the second set of actions may turn the display ON and the other device ON.

In embodiments, the processor of the display device may be configured to automatically determine whether the other device is ON or OFF, and the UI for the other device may only be presented if the other device is ON.

In embodiments, the processor of the display device may be configured to automatically determine whether the other device is ON or OFF, and the UI for the other device indicates whether the other device is ON or OFF. In embodiments, the UI for the other device may include a selectable command to switch the other device between ON and OFF and vice-versa.

In embodiments, the processor of the display device may be configured to automatically determine whether the other device is in use and to make an inference of relevant activities for the other device based on a current mode of operation of the display device. In embodiments, the selectable commands presented by the UI may depend on the determination of whether the other device is currently in use.

In embodiments, the processor of the display device may be configured to at least one of activate and update the UI for the other device based on automated network communication with a remote service provider.

In embodiments, the UI may be configured to allow a user, while watching the display device operating in a first mode of operation, to launch an application operable in a second mode of operation.

In embodiments, the UI may be configured to allow a user, while viewing content on the display device, to accept content-related commands for the other device, and to communicate the content-related commands to the other device. The content-related commands communicated to the other device may include at least one data element with information based on the content.

In embodiments, the processor of the display device may be configured to detect a current operational state of the other device and to change the UI for the other device based on the operational state of the other device.

In embodiments, the UI may include a user-selectable and user-definable search feature that is operable to search at least content stored on the other device, content available from a remote on-demand service, and/or a scheduled programming service. The processor of the display device may be configured to perform such searches together, e.g. serially or in parallel, based on a single input from the user.

According to further aspects of the invention, a method of controlling a peripheral device via a display device may include presenting a user interface (UI) on the display device based on capabilities of the peripheral device. In embodiments, the display device may be, for example, a TV including a tuner, AV, HDMI, and/or S-Video inputs etc. The display device may also support various web-streaming and web browsing modes. Embodiments may include automatically configuring the display device to interact with and/or control the peripheral device based, at least partly, on network interaction with a remote service provider.

In embodiments, exemplary methods may include receiving commands at the display device for the peripheral device from a remote control, and communicating the received commands from the display device to the peripheral device. The remote control may be any suitable device, such as a traditional remote control device, a mobile or tablet device executing a remote control application, and/or generally any device, including handheld devices, from which a user can transmit commands.

According to further aspects of the invention, a computer-readable storage medium may be provided including executable code for configuring a computer processor to perform any of the methods described herein.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

For a fuller understanding of the nature and advantages of the present invention, reference should be made to the ensuing detailed description and accompanying drawings.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings:

FIG. 9 shows a process for providing a menu in accordance with at least one embodiment.

FIG. 10 shows a process for determining a highlighted menu option when a movie is currently being watched, in accordance with at least one embodiment.

DETAILED DESCRIPTION OF THE INVENTION

Figure 1:
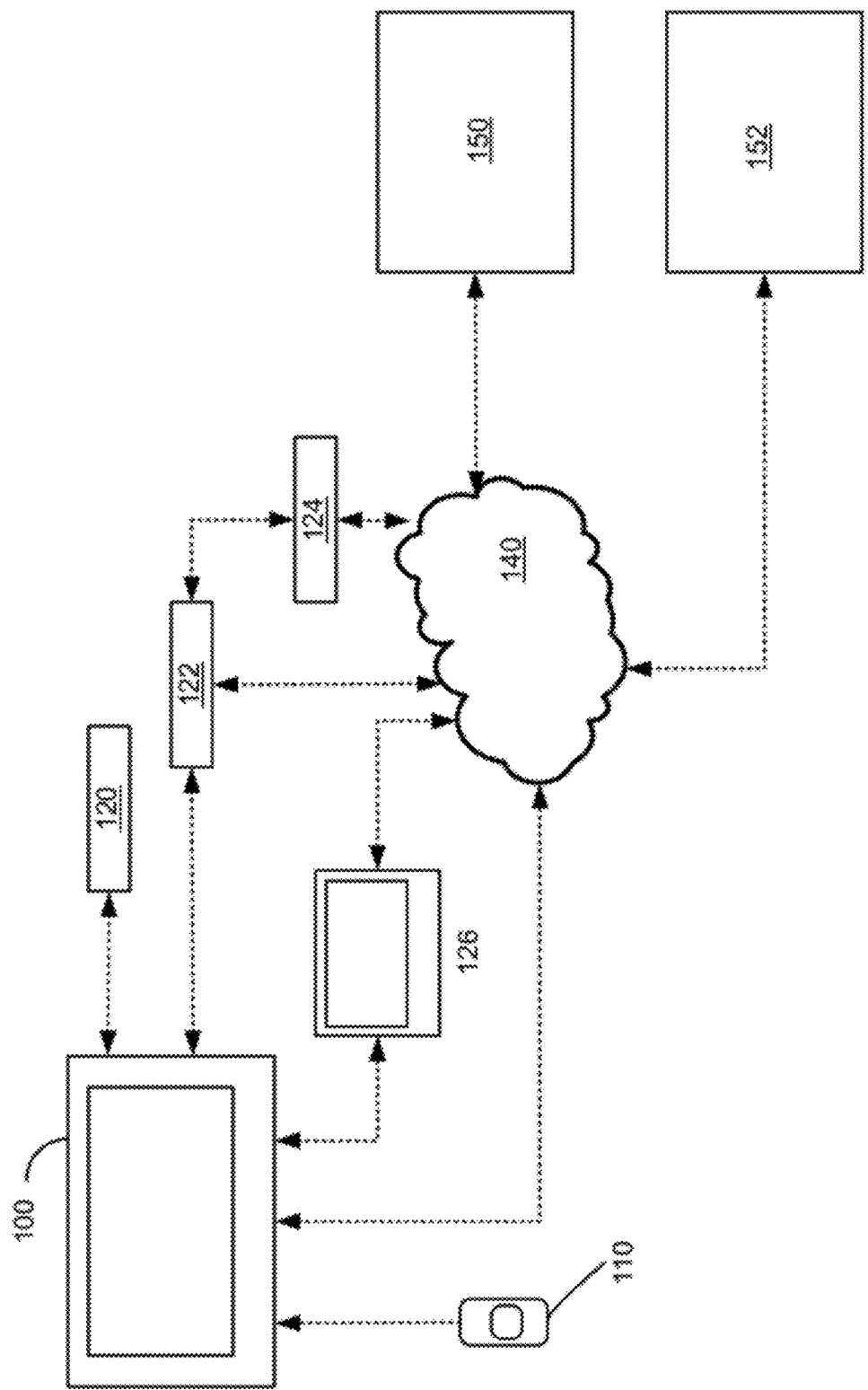
FIG. 1 is a schematic depiction of an exemplary display system and related devices in accordance with at least one embodiment.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a flap" is a reference to one or more flaps and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The present invention may be used to control and operate various electronic devices including but not limited to televisions, electronic games, stereos, receivers, VCRs, DVD players, CD players, amplifiers, equalizers, tape players, cable units, satellite dish receivers, lighting, window shades and other electronic devices, as well as computer applications running on single purpose or general purpose computers and other electronic devices such as those previously mentioned. Almost any number of external devices may be controlled by the present invention as can be accomplished with conventional remote control devices.

FIG. 1 is a schematic diagram of an exemplary display system 100 and related devices for practicing various aspects of the present invention. The display system 100 may include, for example, a display screen, various external controls, a microprocessor, random access memory (RAM), read only memory (ROM), one or more speakers, a data bus, and one or more communications ports and/or devices for receiving and/or transmitting signals such as, for example, IR receivers/transceivers, RF receivers/transceivers, network communication modems, HDMI interfaces, Ethernet ports, USB ports, etc. Various ways of incorporating such components in a display device are known by those of skill in the art and are not exhaustively described herein.

The display system 100 may include a microprocessor, such as a general-purpose digital processor, that controls aspects of the operation of the display system 100. The microprocessor can be a single-chip processor or implemented with multiple components. Using instructions retrieved from memory, the microprocessor may be configured to control the reception and manipulations of input data and the display of data, such as UIs, images and video data, and/or the output of instructions and/or data to external devices.

The display system 100 may be, for example, a TV configured to receive commands, e.g. via IR signals and the like, from remote control 110. The remote control 110 may take various forms, for example, from a relatively simple remote control with ON/OFF, volume and channel functions, to universal remote control with an onboard programmable processor, memory, display, etc. In some embodiments, the remote control is a mobile device, tablet computing device, other handheld device, or other device executing an application that enables use of the mobile device or tablet computing device to control one or more other devices in accordance with the various embodiments. According to aspects of the invention in accordance with at least one embodiment, a relatively simple and inexpensive remote control 110 may be used by offloading the variety of functions related to external devices from the remote control to the display system 100. For example, the remote control 110 may be one designed for use only with the display system 100, i.e. not a universal remote, and may have limited, or no, onboard programmable functionality. In embodiments, the remote 110 may be permanently configured to transmit only a limited number of command signals. Of course, it should be appreciated that aspects of the invention may also be useable with more advanced, programmable, universal remote controls.

The display system 100 may include a network interface to send and receive data over a network connected to other electronic systems such as, for example, computer system 126. The network interface may also include a USB or other connector to connect to myriad peripheral devices, such as mice, modems, keyboards, storage devices, etc. An interface card or similar device and appropriate software implemented by an onboard microprocessor can be utilized to connect the display system 100 to an existing network and transfer data according to standard or other protocols including data over a global computer network such as the Internet. The display system 100 may connect to the Internet 140, which may allow communication with various other services such as, for example, video streaming service 150, web browsing, device software update/activation services 152, etc., via one or more separate components (e.g., a computer system, etc.), or directly.

The display system 100 may communicate directly or indirectly with various other electronic devices, such as, for example, a DVD player 120, Audio/Video Receiver (AVR) 122, gaming system 124, and computer system 126. Such communications may be performed by any well-known communication system that allows communications with external electronic devices, e.g. infrared (IR), consumer electronics control (CEC), Internet protocol (IP), unidirectional and/or bi-directional radio frequency (RF), visible light, light outside of the visible spectrum, ultrasonic, and various other means. In embodiments, such communications may be performed according to predetermined control protocols for the external devices, e.g. according to remote control and/or controller protocols of the external devices. The display system 100 may be configured to obtain such protocols, for example, from remote service provider 152 over the Internet 140, local programming input, a local computer network, direct communication with external devices 120, 122, indirect communication with device 124, and/or receiving a "signal sample" from another remote control.

The display device 100 may include memory and one or more processors that collectively execute instructions stored in the memory. The one or more processors may operate a background application that collects information and performs operations in accordance with the present disclosure. For example, the one or more processors may enable the display device to implement a background application that determines various menus and presents the various menus while the display device simultaneously displays other content. The memory may additionally store various information that allows for various determinations to be made for the presentation of dynamically determined menus in accordance with the various embodiments. For example, the memory may store one or more tables or other data structures that may include various information about various devices that are used with the display device 100. In addition, the display device (or other device) may be configured to interact with external devices over several mediums, including, but not limited to, IR, integrated IR, external blaster accessory, IP, CEC over HDMI, IP over home network, RF4Ce, Bluetooth, and the like.

The present invention is well suited for use with a global computer communication network such as the Internet 140. However it can be appreciated that, as future technologies are created, various aspects of the invention may be practiced with these improved technologies. In addition, various wireless technologies provide a suitable communications medium for operating aspects of the present invention.

Remote control 110 may include various functionality, typically including some form of wireless communications means and various input buttons that allow the user to execute one or more commands to the display system 100. In embodiments, remote control 110 may be, for example, a smart phone, PDA, tablet computing device, or other hand-held device with the ability to transmit at least some wireless command signal.

According to aspects of the invention, the display device may be configured to provide various menus and UI for the control of external devices such as those shown in FIG. 1. For example, a first screen 200 shown in FIG. 2 may be displayed on the screen of the display device 100. Screen 200 may include a background 210, which may be, for example, a TV broadcast, a streaming video, a video game, or web browser view. In one embodiment, the UI is an overlay upon such existing content on the display. Upon activation of the UI, screen 200 may also include navigation bars 220, 230, and selection bar 240, or other UI bars described herein, which may be responsive to commands received from remote 110. For example, remote control 110 may include "navigation" arrows that allow the user to move between bars 220, 230 and 240, and within selection bar 240. The remote 110 may also have a "select" button to activate a highlighted bar or selection. Generally, a UI may be designed such that it can be navigated with other input mechanisms, including mice, track pads, touch screens on mobile or other devices, and the like.

Figure 2:
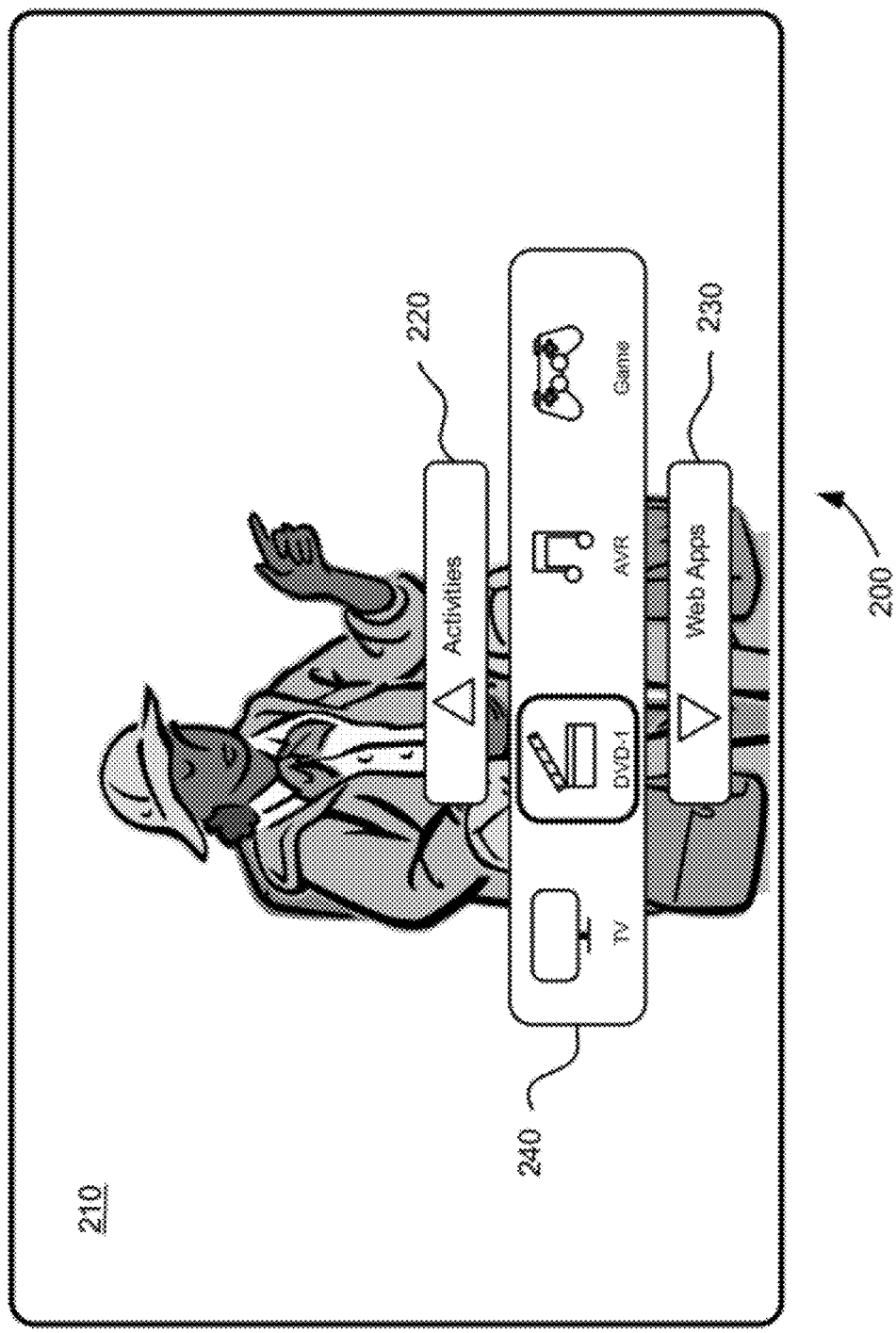
FIG. 2 is a depiction of an exemplary screenshot including a device select UI in accordance with at least one embodiment.

As shown in FIG. 2, the device selection bar 240 may be considered a "Device" UI and may include UI functionality for selecting various devices, including devices external to the display device 100. For example, the user may select operation of the "TV" icon for the display device itself, the "DVD-1" icon for the DVD player 120, the "AVR" icon for the AVR 122, or the "Game" icon for video game 124. One, more, or all selectable options on the UI (or other UIs) may be options that are incapable of being selected using a dedicated input of a remote control device. For example, a remote control used to navigate the UI shown in FIG. 2 may not have any inputs capable of being used to select any of the options in the menu other than one or more buttons that are used to select a currently selected option in the UI. For instance, a remote control may not have a button that allows selection of "DVD-1," as illustrated in FIG. 2. It should be noted that the devices shown in the device UI are provided for the purpose of illustration, and different devices may be shown in a device UI. Further, in place of one or more devices, one or more icons may correspond to an input of the display or other device, for example, if the exact nature of the device is not known. The devices or other icons shown may correspond to those devices that are actually in communication with the display device, although other configurations are considered as being within the scope of the present disclosure. It should further be noted that, although various screens described herein may be referred to for convenience and ease of understanding as "Device UI", "Control UI", "Activities UI" etc., it should not be inferred that each necessarily represent a discreetly operating user interface engine. Rather a single code engine, or various combinations of any number of code engines may be used to implement such functionality.

Display system 100 may be configured to show, for example, only devices detected by the display system 100, devices selected and/or input by a user, devices that have been previously detected and/or input that are currently ON, devices that are currently in use, devices that have been used recently, or other predetermined or user-selected criteria. In cases where all detected and/or input devices are not currently displayed, the device selection bar 240 of FIG. 2, or other UI, may include additional icons, and the like, for forcing display of the un-displayed devices, e.g. to allow turning a device ON, controlling a seldom used device, etc. In embodiments, the UI may show commands for all devices attached to the display device, whether they are in use or not. This way, the user can turn ON/OFF an external device from the UI directly, thus minimizing the number of buttons on the controller or alleviating the need for a LCD on the controller.

The UI including bars 220, 230, and 240, as well as other UI and screens described herein, may be displayed, for example, manually, e.g. by pressing a single button on the remote 110, or automatically, e.g. when a new external device is detected, when an external device is turned ON, when predetermined content is detected by the display device 100, and/or according to an application running on display device 100 or an external device. In embodiments, the remote control 110 may include a dedicated control (e.g. a hard or soft button) that causes a UI to appear on the screen of the display device. Likewise, when the user is done navigating the UI, it may be closed by pressing the dedicated button or after a timeout.

In embodiments, the display device 100 may be configured to infer what external devices are in use and/or relevant activities by tracking, for example, which display device input is selected. Such processes may include an initial identification and association of the particular external devices and input sources, e.g. as an initial setup process flow, through CEC device identification, or in other ways.

When the user selects, via remote control 110, either of navigation bars 220, 230, the displayed UI may be changed to present one or more different selection bars and navigation bars. For example, as shown in FIG. 2, selecting navigation bar 220 may present an "Activities" bar, or selecting navigation bar 230 may present a "Web Apps" bar, discussed further herein.

When the user selects, via remote control 110, a device icon from device selection bar 240, a variety of functions may be implemented. For example, selecting the device icon "TV" may make available command functions for the display device 100 itself, selecting the device icon "DVD-1" may make available command functions for the DVD player 120, etc. Selecting an icon for an external device may also cause, for example, an input and/or operating mode of the display device 100 to change to an appropriate mode for the selected device, if applicable, and/or cause predetermined commands to be sent to the selected device, e.g. a power ON command, etc. As shown in FIG. 2, the DVD-1 icon is highlighted. In this particular example, the DVD-1 icon is highlighted by a rectangle that surrounds the icon, although the icon, or any icon, can be highlighted in any manner. Generally, highlighting may be performed in any manner that emphasizes an item being highlighted. The user may have used navigational controls of a remote control device to cause the DVD-1 icon to be highlighted. The DVD-1 icon may have been automatically for highlighting for various reasons discussed below. For example, the display device (or another device) may have determined that, when the user caused the device UI to appear, the DVD-1 icon was most likely to be selected by the user and/or it was determined that the user was utilizing a DVD player at a DVD-1 input when the user took an action that caused the UI to appear. It should be noted that various options of a UI may be de-emphasized. For example, options for devices that are not currently operable, due to a power-off state, a lack of connection, or another reason, may be displayed with less brightness, moved to a less prominent place on the UI, or otherwise displayed in a manner that is emphasized less than other devices which are currently operable. As an illustrative example, if a user often uses a gaming system but a connection to the gaming system is not detected, an icon for the gaming system may be displayed less prominently than if the a connection to the gaming system is connected. In other embodiments, as mentioned above, various options of a UI may not be presented. For example, options for devices that are not currently operable, due to a power-off state, a lack of connection, or another reason, may not be presented.

Figure 3:
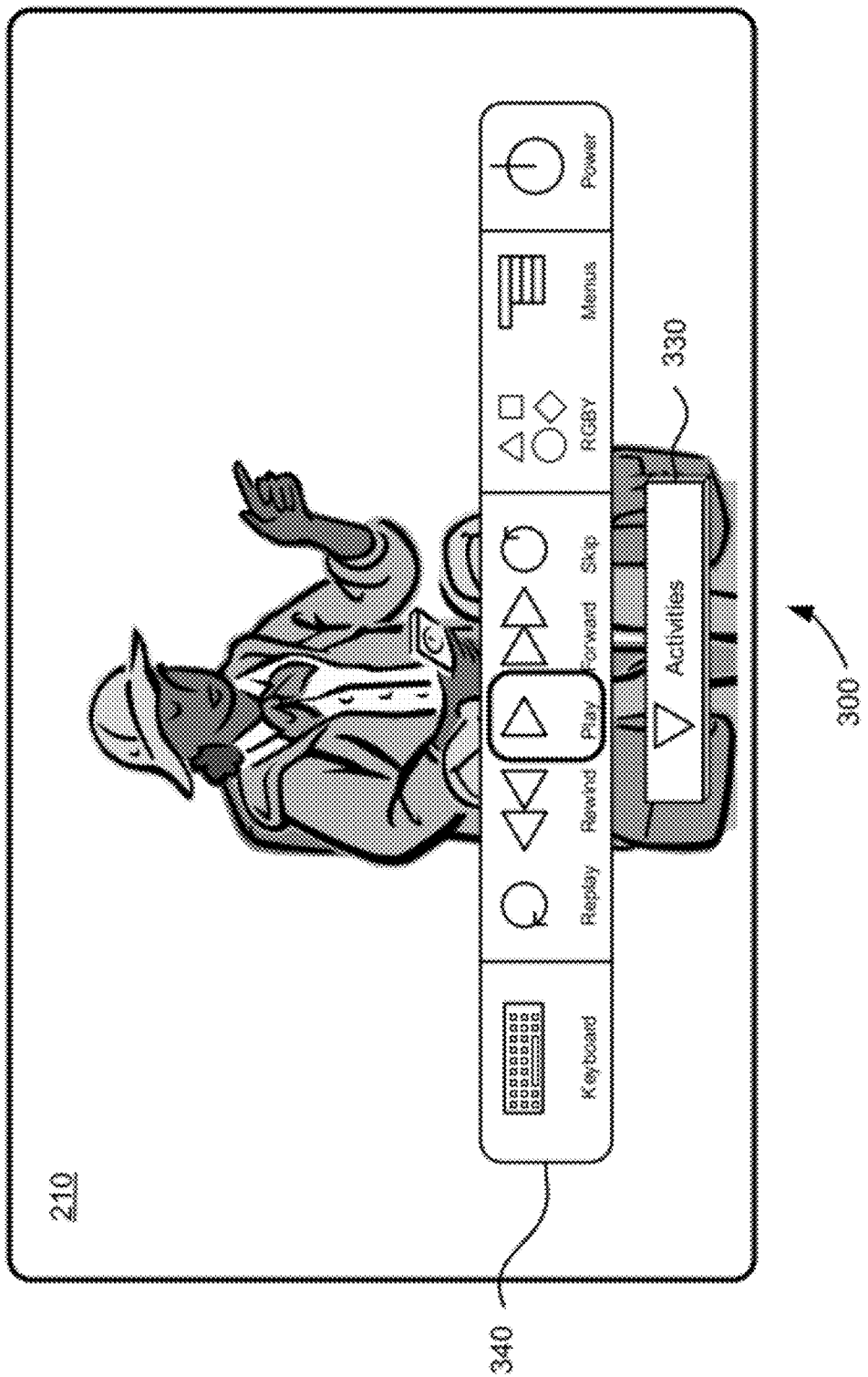
FIG. 3 is a depiction of an exemplary screenshot including a command select UI in accordance with at least one embodiment.

By way of further example, selecting a device icon from device selection bar 240 may cause the UI to change and present an appropriate "Command" UI as shown in FIG. 3. As shown in FIG. 3, the screen 300 may include the same background 210 as shown in FIG. 2, or a new background depending, for example, on whether a mode of the display device 100 was changed based on the input command. For example, if the background is from a video, the background 210 may be updated according to a current frame of the video. The navigation bar 330 may be a new navigation bar based on the relative position of the "Command" UI with respect to other UI. In this case, navigation bar 330 presents a selectable option to navigate to an "Activities" UI discussed further below. In embodiments, the user may define, and/or the display device 100 may automatically determine, a hierarchy for the various UI screens such that the user may navigate most easily between their preferred or often used UI screens. Likewise, the UI that is initially displayed to the user may be preconfigured by the user and/or based on other detected factors such as content being viewed, detection of a new device, etc.

As also shown in FIG. 3, a control selection bar 340 may include various control icons specific to a selected device, e.g. DVD player 120. Such icons may be based on predetermined criteria related to the type of device, and/or may include operations specifically determined for the device model, manufacturer, etc. For example, the display system may have pre-loaded commands for commonly used devices, and/or specific makes and models of devices, and/or may be configured to receive or access device command information as needed for detected or input devices. Such updates may be performed, for example, upon detecting an external device or based on a user adding an external device to be controlled. The display or other device may dynamically determine what commands are to be displayed, as described in more detail below.

In the example shown in FIG. 3, command selection bar 340 includes, among others, icons for "Replay", "Rewind", "Play", "Forward" and "Skip" for instructing DVD functions. Command selection bar 340 may also include a "Power" icon for turning the selected device ON and OFF. Upon selection of such icons, and others appropriate to various devices under control, the display device 100 may communicate appropriate commands to the selected device via, for example, a wireless command signal that the selected device is configured to receive and respond to, or via HDMI connection and the like. As shown in FIG. 3, a "play" command is highlighted. As above, the user may have navigated to the play command or the display device (or another device) may have determined that the play command was the most likely to be selected by the user. As one illustrative example, a video may be in a paused state and, as a result, the display or other device may have determined that the next command selected is likely to be play.

The UI, and particularly command UI such as shown in FIG. 3, may also be aware of the current state of the external devices in use, and may change an icon representing a function state, in order to, for example, minimize the need for navigation of the UI. For example, if a live TV broadcast is paused by the user (such as by a digital video recorder (DVR)) via a command selection bar similar to that shown in FIG. 3, the UI may automatically highlight for activation the "Play" command icon and thus avoid the user having to manually navigate the menu of DVR commands. As another example, if a user has opted to mute an external device such as an AVR, an icon presented on the TV, such as a volume icon, may be change to indicate that the AVR device is indeed muted. In embodiments, such changes may be based, for example, on two-way communication with the external device, such as by HDMI, that allows the display device to confirm that certain commands have been executed.

Command selection bar 340 may also include icons for commands that are not specifically directed to the selected device, but that may be otherwise related to the selected device. For example, upon selecting a DVR or other playback/recording device while viewing a video program, movie, etc., the device UI may bring up commands for the selected device and other related commands for the display device itself, such as input source, mode, etc. Such functions may be particularly useful when it is not immediately clear what a particular device is being selected for based on currently viewed content or other factors. For example, while watching video programming, a user selecting a DVR device might want to record the currently viewed content, switch to watching a pre-recorded show from the DVR, view a menu of available content from the DVR, etc. Providing the user with an intelligent selection of command icons may help improve the ease of use as well as inform the user that certain options are, or are not, available.

Command selection bar 340, and the like, may also be configured to present sub-groups of commands, for example, in an order of most likely usage, e.g. "Volume" may be accessible before "Inputs", which may be accessible before "Sound modes" on an AVR, etc. The UI may present commands within a sub-group in an order of most likely usage, e.g. "Stereo" accessible before "Surround 5.1", which may be accessible before "Jazz" or "Mono" in a "Sound modes" sub-group. The order of the command icons may be defined, for example, based on tracking usage of a community of users, on tracking usage of individual user, and/or based on the nature of content being viewed. For example, if the user is watching a concert video, the display device may be aware of, or otherwise determine through programming guides and the like, the nature of the content, and prioritize displayed command icons based on expected input for watching concert videos or related content.

Figure 4:
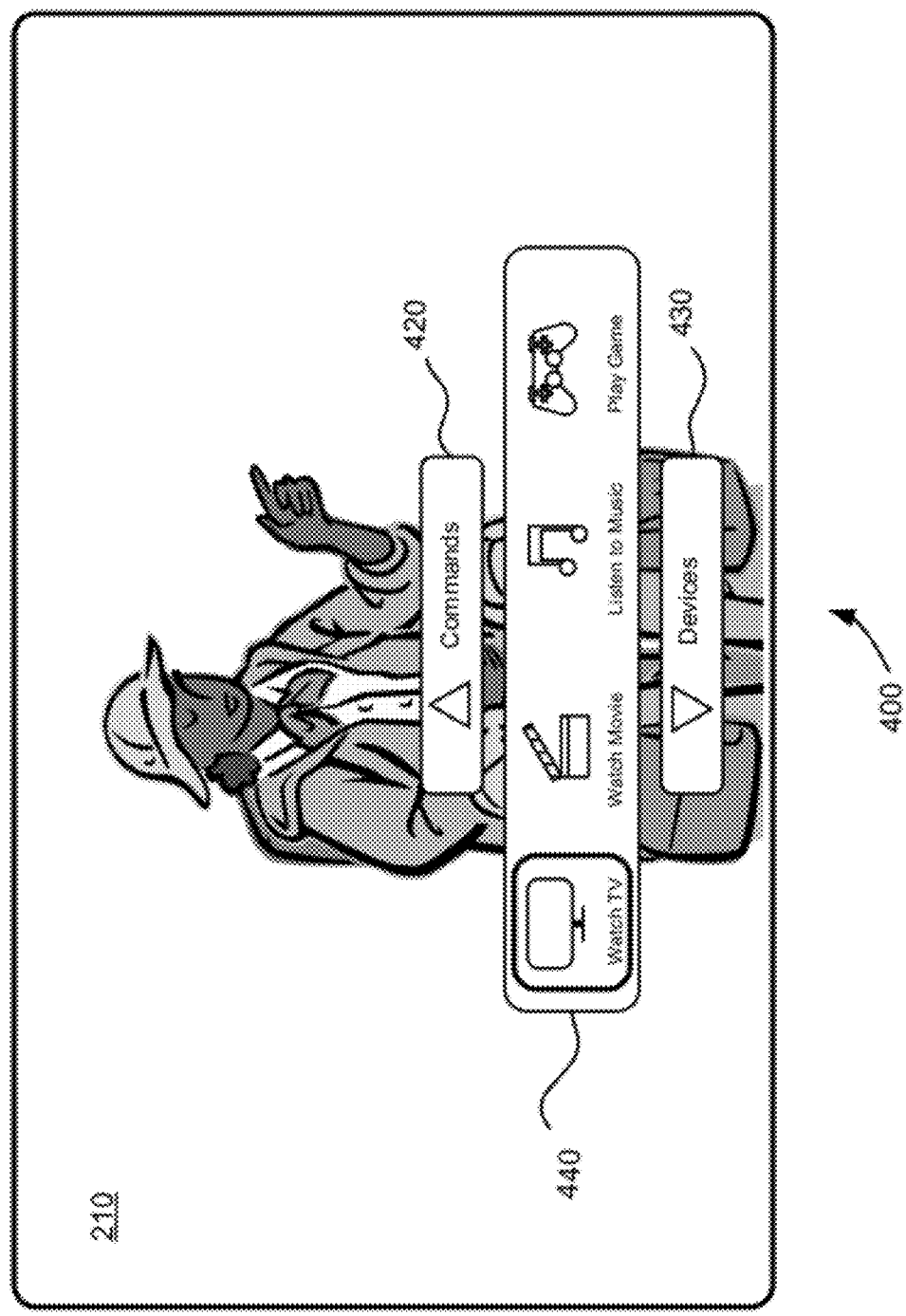
FIG. 4 is a depiction of an exemplary screenshot including an activity select UI in accordance with at least one embodiment.

The user may also select the navigation bar 220 to switch to an "Activities" UI shown in FIG. 4. As shown in FIG. 4, the screen 400 may include the same background display 210 without interruption, and present new navigation bars 420, 430 and activity selection bar 440. Activity selection bar may be configured to present various predetermined and/or dynamic activity icons representing categories of activities. For example, as shown in FIG. 4, activity icons may include "Watch TV", "Watch Movie," "Listen to Music", and "Play Game". These icons may be dynamically displayed according to, for example, specific devices and/or applications that have been detected or input for control by the display device 100. In the example shown in FIG. 4, "Watch TV" may be a permanent activity icon related to an inherent capability of the display device 100, whereas "Watch Movie", "Listen to Music", and "Play Game" may be a dynamically loaded activity icons based on the detection and/or input of DVD player 120, AVR 122, and video game 124, respectively, or other online available service.

In embodiments, the selection of an activity associated with particular devices may be configured to send commands to one or more devices under control, e.g. to turn on and/or adjust settings of the device(s) associated with the activity, etc. The selection of the activity may also initiate internal commands to the display device 100, such as switching an input source, a viewing mode, sound settings, etc. By way of further example, selecting a "Watch Movie" icon may turn on a movie source device or application, such as a DVD player, adjust sound setting of the AVR and the like, dim home lighting, and adjust the brightness of the display device. As shown in FIG. 4, a "Watch TV" icon is highlighted. As above, the user may have navigated to the icon or an automated process may have determined that the icon should be highlighted.

The display device 100 may also be configured such that the selection of an activity icon from the activity selection bar 220 switches the UI to a device UI, similar to that shown in FIG. 2, or other UI, displaying a tailored group of controllable device and/or application icons relevant to the selected activity. For example, selecting a "Watch Movie" icon may bring up a UI with all available devices and/or applications that the display device can control with the ability to feed movies to the display device, as well as any other devices that may be relevant to movie watching, e.g. home lighting etc. Other configurations are also possible, such as drop down menus and the like, for selecting a desired device under a particular activity icon.

Figure 5:
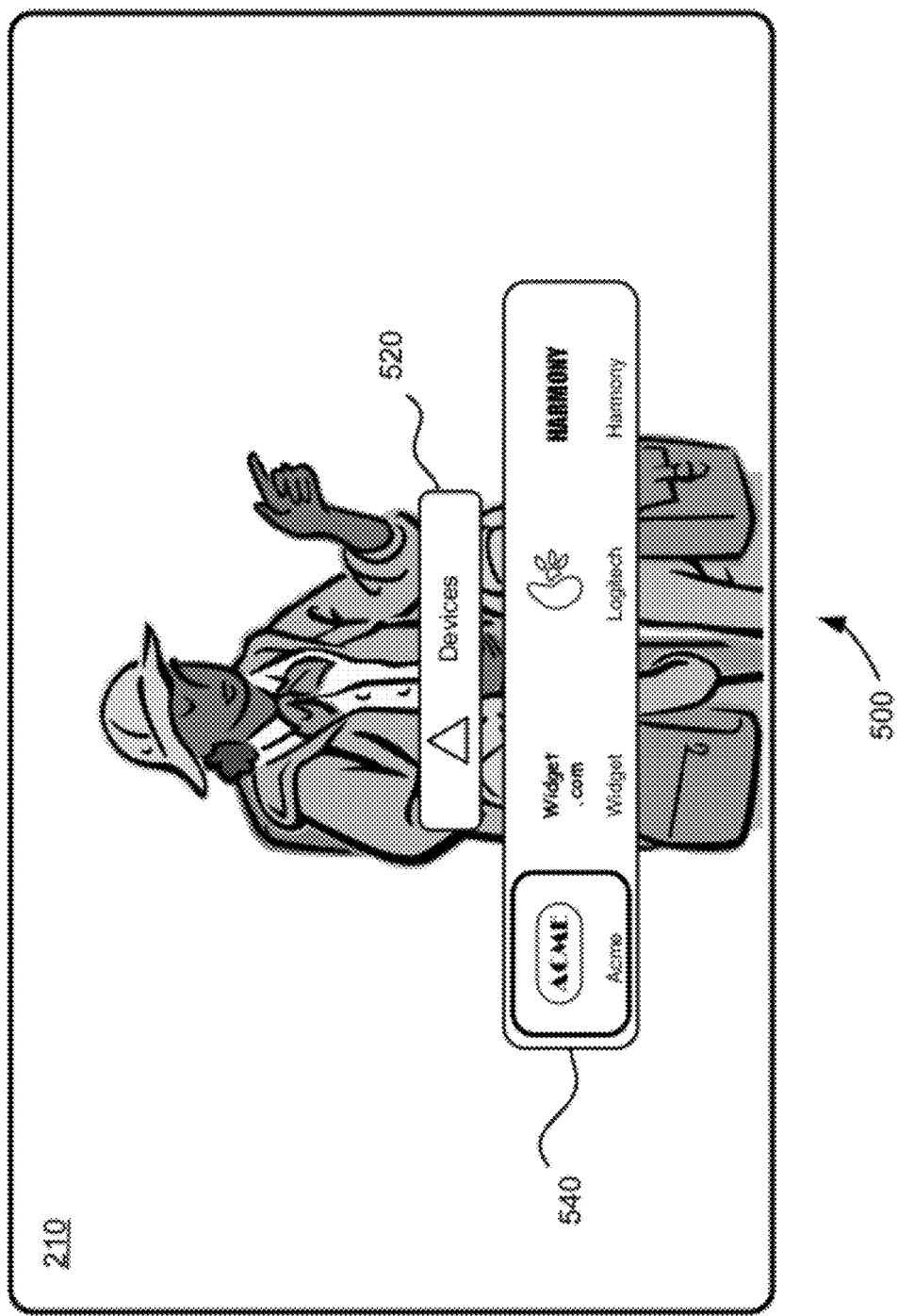
FIG. 5 is a depiction of an exemplary screenshot including an application select UI in accordance with at least one embodiment.

In embodiments, the UI may also include a screen for application selections, such as web-based and/or computer-operated applications. An example of such an "Application UI" is shown in FIG. 5. As shown in FIG. 5, a screen 500 may be presented with an ongoing background presentation 210, and include a navigation bar 520 to a Device UI, and an application selection bar 540. Application selection bar 540 may include various application initiation icons, such as, for example, web browsers, specific web sites, web streaming services, etc. Accordingly, the UI presented on screen may enable a user to, for example, interact with social networks, or other web-based applications, and the like, while continuing to view content on the display. For example, a selectable icon may be used to open chat windows and the like in a portion of the screen, along with an on-screen keyboard that the user can navigate and input text. In embodiments, the applications opened may be automatically informed of content-related information, such as, for example, details of a show being watched on the screen which may in turn be used to guide the user to a desirable social network and/or online chat discussion.

In embodiments, the display device 100 may be further configured to provide support to online lifestyle functions. For example, based on a selected "activity," the UI may display a limited number of specific command icons for access to applications which the user can interact with in the context of watching a specific piece of content. This may include, for example, by selecting activation of an online posting service while watching a particular show, the display device can automatically access the online posting service via an IP device and post a message such as "User XYZ is watching show ABC," where "user XYZ" and "show ABC" are variables that can be replaced with a user identifier (such as username) and the title of a show, respectively. Additionally and/or alternatively, the UI may present the user with a list of preconfigured posts, which may be based on content being watched, to automatically transmit when selected via the UI. Therefore, at the push of a single button on a TV UI, a user could automatically post a message such as "I like show ABC" on a social networking site (e.g., Facebook®, Twitter®, Etc., to name just a few), while still viewing content on the TV.

As noted above, the particular application selection icons presented may be tailored based on a type of content being viewed. For example, the UI may be configured to provide ready access to sources of information, e.g. from the Internet, related to the content currently consumed. One such option may be that, when watching a movie, the UI presents icons automatically, or manually, determined to be relevant to movie content, e.g. movie database websites, movie review websites, etc. In embodiments, the display system may be configured to automatically extract specific content from websites and the like based on the type of, or specific, content being viewed. The UI may be configured to, for example, open an overlay UI, or a picture in picture, showing a director filmography, actors' biographies, movie synopsis, user reviews, user ratings, etc. for a movie being watched. Such functions may be enhanced by including content-related information in commands sent to the websites, e.g. automatically including the name of the movie being watched to a movie database website upon selection of the movie database website icon.

By way of further example, when watching a sports game, the UI may be configured to provide quick access via a limited number of command icons to a website or other service with tabulated information about the game being watched, results of other games, and/or player/team statistics. As another illustrative example, a normal view of a football game may be shown prominently on the screen of the display device and a birds-eye view of the field may be shown in a smaller portion of the screen.

Such applications and services may be implemented and/or accessible directly by the display device 100 or may be initiated and/or executed via an external device. For example, for TVs with built-in browsing and/or streaming functionality, the TV may initiate and receive data, video and/or audio streaming via the Internet and the like. In other cases, an intermediate device, such as a video game console 124, may be used to access streaming content, e.g. that is delivered from service provider 150 and the like, to the display device 100 via the video game console 124. As also shown in FIG. 1, configurations where a video game, or other device communicates to the display device 100 via an intermediary device, such as AVR 122, are also possible. Other examples of intermediate devices include set-top boxes, content appliances such as the Logitech Revue available from Logitech®, and other devices may participate in various embodiments of the present disclosure.

It should also be noted that the UI presented on the display device, such as a TV, may enable a user to launch applications integrated on the display device, e.g. a video streaming service, without the need for user to stop watching TV and separately launch the application portal in order to switch modes of operation, e.g. from watching broadcast TV to video streaming or playing an onboard TV game such as may be downloaded from TV application stores and the like.

The display system 100 (also referred to herein as the display device 100) may also be configured to allow a user, while viewing content on the display device, to accept content-related commands for an external device or application, and to communicate the content-related commands to the external device or application. The content-related commands communicated to the external device or application may include at least one data element with information based on the content. For example, the UI can present the user with the option to queue a show currently being watched on broadcast TV to an on-demand video streaming service queue, at the selection of a single icon in the UI. Such commands may include, for example, registering a time stamp where the live show is stopped, in order to begin it at another time via an on-demand service precisely where the user left off.

In embodiments, the UI may also include a user-selectable and/or user-definable search feature that is operable to search, for example, content stored on an external device, content available from a remote on-demand service, and a scheduled programming service. The processor of the display device may be configured to perform such searches together, e.g. serially or in parallel, based on a single input from the user. Such searches may be presented to the user and/or performed with content options related to content currently being watched, e.g. a "show me more like this" search, etc. Additionally, search results may be presented in an order related to the currently viewed content or type of "activity" as described herein. For example, if a user is watching live TV, which may be interpreted as a "Watch TV" activity, live show search results may be presented before recorded shows, which may in turn be presented before future live shows, which in turn may be presented before Internet shows (which may require devices different from those needed for the current activity).

In various embodiments, UI services for controlling external devices may be turned on remotely, for example, by cable TV providers, remote service providers, etc. that may send activation signals to the display device. Activation may thus allow for additional functionality to be added to a remote control device, as part of a pay service or the like. For example, before activation, a power button on the controller 110 may only turn the display device 100 on. After activation, which may, but does not necessarily, include payment of a fee, and/or registration with a service provider, etc., the power button on the controller 110 may turn the TV ON and trigger an onboard application to turn an AVR and STB ON, and switch TV and AVR inputs. Thus, the same power button on the remote 110 may be effectively transformed from a "TV ON" button to a "Watch TV" activity button with multiple related functionality.

In embodiments, web pages, or other accessible support services, may be provided for configuring exemplary display devices for use with various external devices. For example, web pages, or the like, may be presented to a user on the display device allowing for entry of device identification for external devices under control of the display device. Information relating to the type, brand and model of the external device may be entered into a web page that may access a database to determine configuration and/or control data. Such identification, configuration and/or control data may include, for example, product information, type, brand, model, year, communication type, and signal configuration data.

The display device may also be configured with a database and/or connectivity that allows for the determination of an electronic device by one or more signal samples from the corresponding remote control. The display device may access an onboard, or remote, database that allows for the determination of what inputs and outputs are on the electronic devices associated with given control signals provided by the corresponding remote control. An onboard database may be updated at periodic intervals regarding updated information or regarding new electronic devices on the market.

One method of operating the display device to identify an external device to be controlled is to manually sample a signal emitted from a remote control corresponding to the electronic device to be controlled. Prior to sampling the signal, the user may select a "Sample" icon on the UI which will place the display system in sample mode for receiving one or more sample signals via one or more communication mechanisms such as an IR receiver, etc. Signal sampling has been performed within the remote control industry for years and is well known to those skilled in the art particularly with IR sampling. No further discussion of signal sampling is required as the same is readily apparent in the art.

The display device, and/or a remote service provider, may analyze the sample data to determine a type, brand and/or model of each of the electronic devices that are controlled by the corresponding sampled signal. Once the type, brand and/or model of each of the electronic devices is determined, the display device or the remote service provider may generate configuration data that is loaded and/or downloaded to an active memory of the display device. The configuration data configures the display system so that it is able to control all of the external electronic devices as, for example, a remote control manufactured for the external device would. The user may then access various UI as described herein to control the associated external device. In embodiments, the display system may also prompt the user via the UI for additional information that may be used to create a personalized configuration.

As mentioned previously, the user may avoid sampling the signal from each of the remote controls and instead directly enter product information into the UI, or other accessible remote service, such as a web page. The user may enter, for example, relevant product information such as but not limited to device type, e.g., VCR, television, DVD player, home lighting device, etc., brand and model.

Once the display device or remote service has determined the type, brand and model of the input external device, the display device or remote service may generate corresponding configuration data that is loaded or downloaded to an active memory of the display system, and may be used by the display device to control the input external device as discussed previously.

The display system may also be configured to automatically determine a type, brand and/or model of an external device via communication with the external device itself. For example the external device may have a two-way communication capability, such as HDMI or USB ports, etc., and may exchange information with the display device sufficient for the display device to recognize the external device's type, brand and/or model, similar to "plug-and-play" type recognition.

Figure 6A:
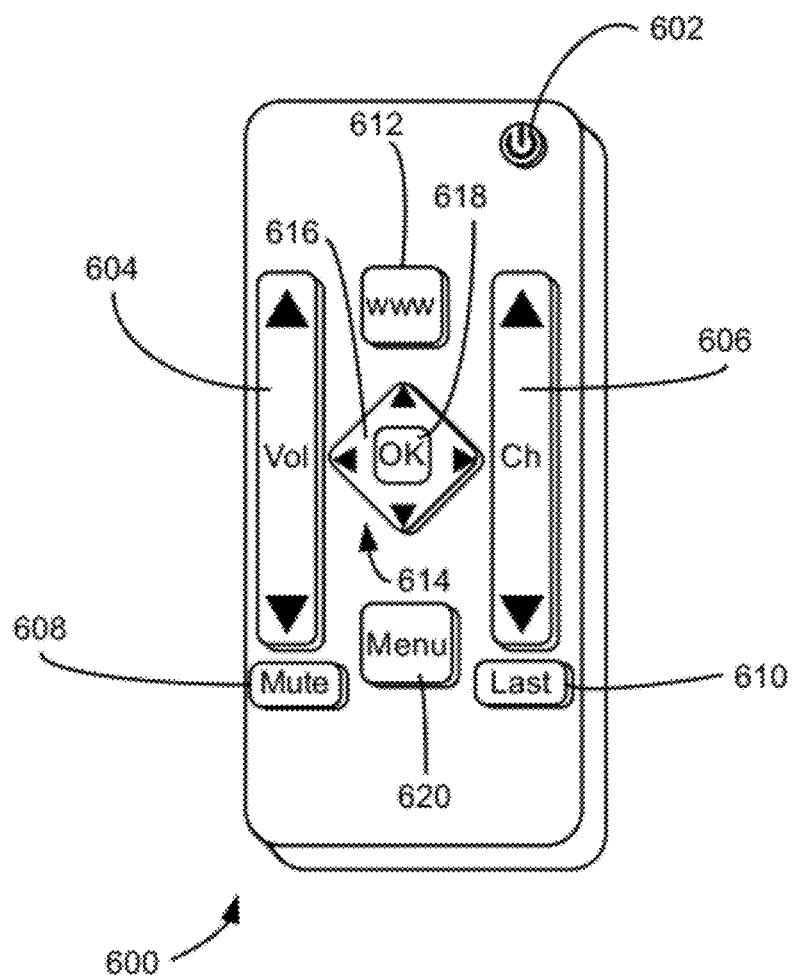
FIGS. 6A-6B show example remote control devices in accordance with at least one embodiment.

As noted above, various embodiments of the present disclosure allow users to control a UI using various devices. In some embodiments, users are able to control a UI using a remote control device. FIG. 6A illustrates an example remote control device 600 that may be used in accordance with various embodiments. In this particular example, the remote control device 600 is simpler than typical remote control devices. For example, although a TV and/or other device may have numerous functions, the remote control device 600 in this example has eight tactile inputs, although a typical TV or other device may have many more than eight possible functions that can be performed. It should be noted that the remote control device 600 illustrated in FIG. 6A is provided for the purpose of illustration and that a wide variety of remote control devices are considered as being within the scope of the present disclosure. As just a few examples, a remote control device may include fewer or more tactile inputs than illustrated and/or may user other input mechanisms for user input, such as a touch screen, touch pad, and/or other device. As discussed below, other devices, such as handheld computing devices executing applications for remote controlling may be used to control a UI.

In this example, the tactile inputs of the remote control device 600 are in the form of various buttons that correspond to various functions of a TV or other device. For example, the remote control device may have a power button 602 that, when selected, causes a TV and/or other device to toggle between a power-on state and a power-off state. Selection of the power button 602 (or any other button and/or combination of buttons) may cause the remote control device 600 to transmit an appropriate signal (or collection of signals) to the TV and/or other device. Receipt of a signal from the remote control device may cause the TV and/or other device to perform a corresponding function.

In this example remote of control device 600, other tactile inputs correspond to frequently used functions of a TV. For example, the remote control device 600 may include a volume button 604 and a channel button 606. In this example, depending on where the user selects the volume button 604, the volume of the TV (or other device providing audio content, such as an AVR) may be adjusted accordingly. Similarly, depending on where the user selects the channel button 606, the TV (or other device, such as a set top box (STB)) may tune to a next or previous channel in a sequence of channels. It should be noted that various buttons on the remote control device 600 may cause different functions to happen in different contexts. For example, when a user is watching TV, the volume button 604 and the channel button 606 may cause operations as described above. However, in other contexts, operations performed as a result of selection of the volume button 604 and/or channel button 606 may differ. As an example, in some contexts, selection of the volume button 604 and/or channel button 606 may cause corresponding navigation to occur in an on-screen menu. The signal sent from the remote control may (but does not necessarily) remain the same regardless of the context. Accordingly, the signals received from the remote control device 600 may be interpreted differently depending on the context.

Other common tactile inputs that may be on the remote control device 600 include a mute button 608 and a "last" button 610. Selection of the mute button may cause a TV and/or other device providing audio to toggle between a state where audio is provided and a state where audio is partially or completely muted. Selection of the last button 610 may cause the TV or STB (or other device) to tune to an immediately previously viewed channel. Other common inputs that may be included in the remote control device 600, but that are not shown, include numerical keypads, cancel buttons, and the like. The remote control device may also include a QWERTY keyboard and/or other input devices in some embodiments. The remote control device may also include a display that may or may not be a touch screen. The display may include one or more soft buttons for selecting options of UIs presented on the display.

In an embodiment, the remote control device 600 includes an Internet button 612. Selection of the Internet button may cause Internet content to appear on the TV display. The Internet content may occupy the complete display, a portion of the display, and/or may overlay other content, such as described above. In addition, the tactile inputs of the remote control in this example include a navigational input 614 which, as illustrated, includes a navigational portion 616 and a selection button 618. The navigational buttons may be used by a user to navigate the various UIs, such as the UIs displayed above. The selection button 618 may be used by a user to select a highlighted option on a UI.

In an embodiment, the remote control device 600 includes a menu button 620. Selection of the menu button 620 may cause a UI, such as a UI described above, to appear on the display device. For example, if the user is watching a movie on the display device and presses the menu button 620, an appropriate UI may appear overlaid on the display. The movie may continue while the UI is overlaid on the display. The user may then navigate the menu, such as by using the navigational input and make a selection of a highlighted item of the UI by pressing the selection button 618. For example, referring to FIG. 3, if the user selects the highlighted play option when a movie or other content is in a paused state, the movie or other content may resume playing. If, however, the user selects the right arrow of the navigational portion 616 of the navigational input 614, the fast-forward option may become highlighted instead of the play option and, if the user then selects the selection button 618, the movie or other content may play at a faster pace. If the user presses the down arrow of the navigational portion 616 of the navigational input 614, the activities selection bar may become highlighted and, if the user selects the down arrow again or the selection button 618, the activities UI may appear in place of the command UI 330. Other possibilities are clear from context and, therefore, are not elaborated upon further.

As noted, the remote control device 600 is provided for the purpose of illustration and a wide range of variations are considered as being within the scope of the present disclosure. For example, in one embodiment, a remote control device is simpler than that shown in FIG. 6A, having only a menu button and navigations keys, such as left, right, up, and down keys and a selector key. Also noted, the functionality of the remote control device 600 may be provided in other ways. For example, in an embodiment, a mobile device (such as a smart phone or tablet computer) is used to generate signals that are used to obtain and navigate menus using any communication method (such as Wi-Fi) that the mobile device is configured with. A remote control application may execute on the mobile device. Execution of the remote control application may cause a representation of a remote control device to appear on a touch screen of the mobile device. A user may, therefore, operate the mobile device as a remote control by touching the touch screen at locations that correspond to displayed buttons or other interface elements.

In addition to the above, other variations are also considered as being within the scope of the present invention. Many frequently used commands such as Volume Up/Down, Mute, Channel Up/Down, Play/Pause, etc. are best accessible from the remote control (as opposed to a UI on a display). However, as some functions are applicable to several devices, e.g. both PVR and DVD support transport commands (Play/Pause), the correct IR or CEC commands may be automatically sent to the content source device currently active, which may be tracked by a device that configures the UIs and/or the remote control device itself. For example, when a user presses a Volume UP option of the remote control device 600, a corresponding signal may be configured and sent to an AVR if the audio is provided by the AVR or a corresponding signal may be configured and sent to a TV if the TV is providing the audio. In this manner, the need for the user to program the TV remote or use the TV UI to access device-specific commands that are frequently used may be partially or completely avoided. Based on the content source device selected, and knowing whether it is connected to the TV or the AVR, the device providing the UI (or another suitable device can for instance determine whether to send: a Play/Pause command to either the DVD or STB; a volume command to the AVR, send it to the TV or process it within the TV.

In an embodiment, the remote control device 600 is a remote control device provided with a display device (such as a TV remote control). The remote control device may include an INPUT button (not illustrated) that invokes the Device UI and as well as the TV inputs menu. The remote control device 600 may also include a FAVORITE button on the TV remote should invoke an appropriate UI with a Favorite Content menu or a Favorite Content menu that is specific to the current activity or currently selected content source, e.g. Favorite Channel for "Watch TV" or STB, and Favorite Internet Radio stations for "Listen to Digital Music" or DMA. In addition, when a TV UI is displayed, the correct IR or CEC command may be sent to the device currently selected in the TV UI, if commands are sent from the remote control device. For instance, a Volume Up/Down command may be sent, by the remote control or otherwise, to either the TV or AVR depending on which device is currently presented in UI. This allows user to control all functions of every device, even if the TV UI does not include a command but the command is accessible on the remote control.

Figure 6B:
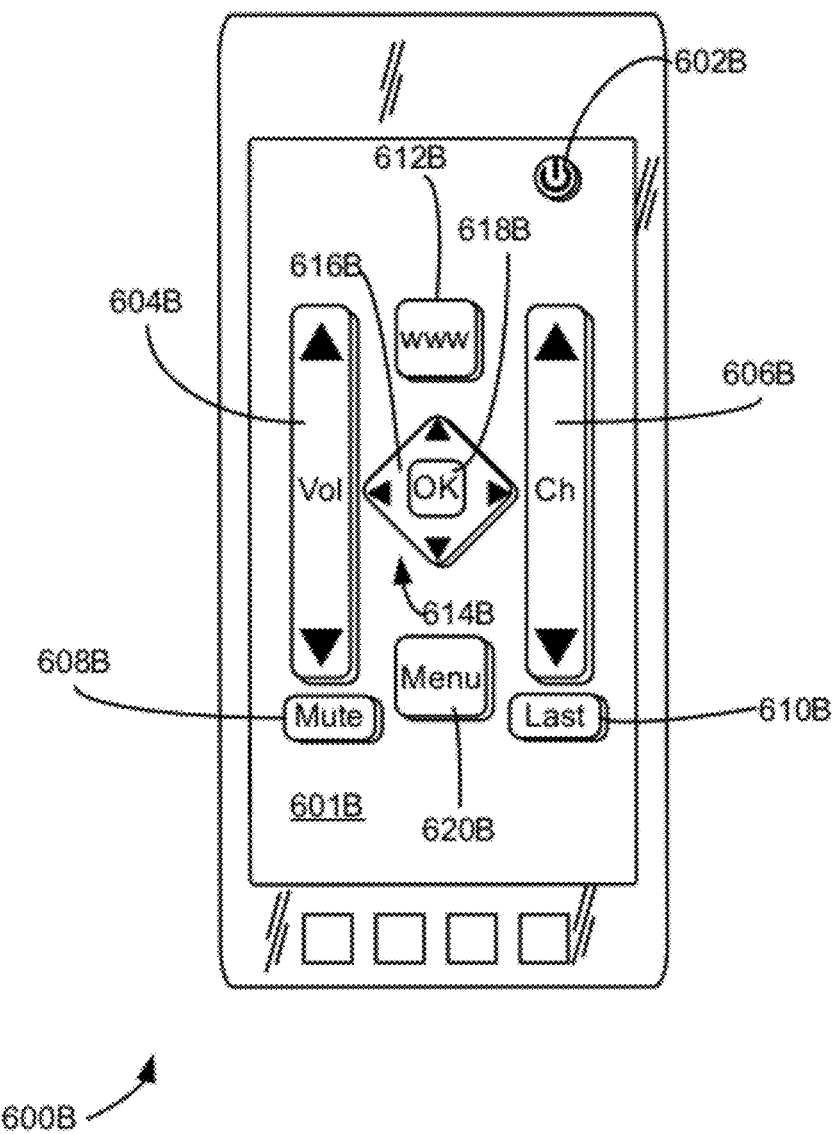

As noted, other devices may be used in accordance with various embodiments of the present disclosure. FIG. 6B, for example, shows an illustrative example of a mobile device 600B which may be used to control one or more consumer electronic devices in accordance with the present disclosure. In this particular example, one or more processors of the mobile device 600B operate according to executable instructions for an application that enables the mobile device 600B to display a UI on a touch screen 601B of the mobile device. It should be noted that, while FIG. 6B shows a device with a touch screen, mobile devices used in accordance with the present disclosure may not have a touch screen, but may have another display that is navigable using input devices other than a touch screen.

In an embodiment, the mobile device 600B displays a UI that includes a plurality of inputs for controlling a UI on a display device of another consumer electronic device (such as a television). The UI of the mobile device, as illustrated, includes buttons such as those described above in connection with FIG. 6A. For instance, as illustrated, the UI of the mobile device in FIG. 6B includes a power button 602B, a volume button 604B, a channel button 606B, a mute button 608B, a "last" button 610B, an Internet button 612B, a navigational input 614B that includes a navigational portion 616B, a selection button 618B, and a menu button 620B. The buttons of the UI of the mobile device 600B may be used in a manner such as described above in connection with similarly-named counterparts in FIG. 6A. In this example, however, the buttons of the UI of the mobile device 600 are not physical buttons as illustrated in FIG. 6A, but virtual buttons. A button on the UI of the mobile device, for example, may be selected by touching the touch screen 601B at a location where the button is displayed on the touch screen. Selection of a UI element on the UI of the mobile device may cause one or more other devices to operate accordingly, such as described above.

It should be noted that the UI shown in FIG. 6B is provided for the purpose of illustration and that variations are considered as being within the scope of the present disclosure. For example, variations discussed above in connection with FIG. 6A may be virtually presented on the UI of the mobile device 602. Further, the display of the mobile device 602 may not resemble controls of a traditional remote control, as illustrated in the drawing. The UI may have numerous variations and, in some instances, the UI of the mobile device may resemble the UI displayed on another device (such as a television). The UI of the mobile device may, for example, change state according to changes in state of the UI of the other device.

It should further be noted that the various UI menus of FIGS. 2-5 are provided for the purpose of illustration and a wide variety of variations are considered as being within the scope of the present disclosure. For example, a UI may present all related commands grouped into a sub-menus, such as "Inputs", "Sound modes", etc. A UI may present sub-groups of commands in an order of most likely usage, e.g., Volume is accessible before "inputs", which is accessible before "Sound modes" on an AVR. A UI may present commands within a sub-group in an order of most likely usage, e.g. "Stereo" is accessible before "Surround 5.1", which is accessible before "Jazz" or "Mono" in a "Sound modes" sub-group. Order may be defined based on tracking usage of community of users, or on tracking usage of individual user, but also based on nature of content in embodiments where one or more devices are configured to be aware of what content is being played and where the one or more devices have access to a source of information describing the content, such as a TV Guide, which may be provided from a remote computer system over, for instance, the Internet. Examples of how this may be accomplished are described in application Ser. No. 13/077,750, entitled "Apparatus and Method for Configuration and Operation of a Remote-Control System" filed on Mar. 31, 2011, referenced above.

As other examples, a UI may include a search interface that allows for interaction with various devices to, for example, enable searching for recorded content on a DVR, live content available for user's channel line-up, or services built into a TV or other device, such as a movie streaming service application. Such embodiments may allow a user to input credentials for accessing various data stores and may include integration with a remote computer system operating to provide such information. As an enhancement, search results could be presented in an order that is related to the current activity. For instance, if user is watching live TV, live shows may be presented more prominently than recorded shows (such as higher in search results), which in turn are presented more prominently than future live shows, which in turn are presented more prominently than internet shows (which may require devices different from those needed for the current activity).

As noted, the UIs presented in FIGS. 2-5 are illustrative examples of just a few possible UIs that may be presented on a display. UI options may be favorites driven. For example, regardless of the video source currently selected, if the user selects a Favorite channel in the TV UI (i.e. a UI on a display device), an appropriate device may dynamically compute and automatically send the correct sequence of IR or CEC codes such that the STB is ON, DVD is OFF, AVR is ON (if needed), the right TV (and AVR if needed) inputs are selected and the STB is tuned to the desired channel. UI options may also be shortcut-driven. For example, regardless of the video source currently selected, if the user selects an Application shortcut, e.g. an Internet content streaming option in the TV UI, the Harmony engine dynamically computes and automatically fires the right sequence of IR or CEC codes such that the STB is OFF, DVD is OFF, AVR is ON (if is for surround sound through HDMI return audio channel), the right AVR input is selected (if needed) and the right application is launched through a SW call to the internal TV API. UI options may also be power-driven. For instance, if no video source is active (only TV is ON), when the user powers ON a content source (e.g. DVD, STB, gaming console, CD) in the TV UI, an appropriate device may dynamically compute and automatically send the right sequence of IR or CEC codes such that the content source is powered ON, the AVR is powered ON (if required) and the right TV (and AVR if needed) inputs are selected. The same may apply if a first content source device is active and the user powers on a second one from the TV UI. In this case, the device computing and sending the codes may also powers OFF the first device. As yet another example, UI options may be input-driven. For example, if no video source is active (only TV is ON), when the user selects in the TV UI a TV or AVR input mapped to a specific content source device (e.g. DVD, STB, gaming console, CD), a device may dynamically computes and automatically send the right sequence of IR or CEC codes such that the content source is powered ON, the AVR is powered ON (if required) and the right TV (and AVR if needed) inputs are selected. The same may apply if a first content source device is active and the user selects a different TV or AVR input from the TV UI. In this case, the device computing and sending the appropriate codes may power OFF the first device.

Various embodiments may also be function driven. For instance, users may be able to trigger an activity by pressing a button on their remote control that is uniquely or most likely associated with an activity. As some examples, if a user presses the POWER button on a TV remote or any other universal controller, e.g. application on a mobile device, "Watch TV" activity is the most likely and therefore may be triggered, i.e. turn TV, STB (and AVR if needed) ON and set TV (and AVR if needed) inputs. A "Watch TV" activity may also be triggered when pressing a button that is uniquely associated with the STB, PVR or DVR, e.g. GUIDE, LIST, DVR, THUMBS UP/DOWN, and the like. A "Play game" activity may be triggered when a user presses a button that is uniquely associated with the game console, e.g. "GAME" (which is often a dedicated button to select a specific TV input) on a TV. If the user has a STB and DVD, but no PVR (personal video recorder), pressing a transport key on the remote controller may trigger the "Watch Movie" activity. If the user has a PVR and DVD, pressing the a transport key on the remote controller may trigger the "Watch TV" activity. Pressing the numeric keypad on a remote controller may trigger a "Watch TV" activity. Pressing the CHANNEL UP/DOWN or PREV on a remote controller may trigger a "Watch TV" activity. Pressing the INPUT button on a remote controller may turn ON the TV, invoke a TV UI application and open the TV Inputs menu in the UI. Pressing the FAVORITE button on the remote controller may trigger a "Watch TV" activity, invoke the TV UI and open the TV Favorites menu in the TV UI. Pressing an OEM-specific button such as VIERCAST on a remote controller should turn ON the TV. Pressing a multiple system operation (MSO)-specific button such as VOD (video on demand) on the remote controller may trigger a "Watch TV" activity. Pressing the FAVORITE button on the remote controller may trigger a "Watch TV" activity. Pressing the FAVORITE button on the remote controller may trigger a special activity where only TV is turned ON and a UI combining shortcuts to various content items or sources may invoked.

As discussed above and elsewhere herein, the various UIs presented in accordance with the present disclosure may take into account the context of how a display device is being utilized. For example, a UI may be configured to only show DVD and AVR commands if currently in a Watch DVD activity. As another example, UIs may be different, dependent on whether a user has upgraded to premium functionality. After the user upgrades to premium functionality, a remote control power button that typically only turns TV power on can trigger an application to turn the AVR and STB ON, and switch TV and AVR inputs. The same power button, in this example, is now a "Watch TV" activity button. As yet another example, UI content can change based on mode of operation. For instance UI may begin by presenting user with an activities menu, such as an Activities UI, as above. Once in an activity, a menu may show commands for devices in use. Alternatively, once in an activity, a UI may show access to sources of information (from the an Internet-accessible information resource) related to the content currently consumed. For instance, when watching a movie, UI can provide quick access to various web sites dedicated to movie content, reviews, and such. Access may be provided by providing an overlay UI or a picture in picture showing director filmography, actors' bio, movie synopsis, user reviews, user ratings, and the like that have been accessed. The information source could also be an online service that has aggregated Internet searches that the community of users of the invention has done over time around a given piece of content. This information may have been collected using IP controllers with browsing capabilities, e.g. smartphone or tablet computing device, and time-referenced with the show a corresponding user was watching. Other examples are considered as being within the scope of the present disclosure.

Figure 7:
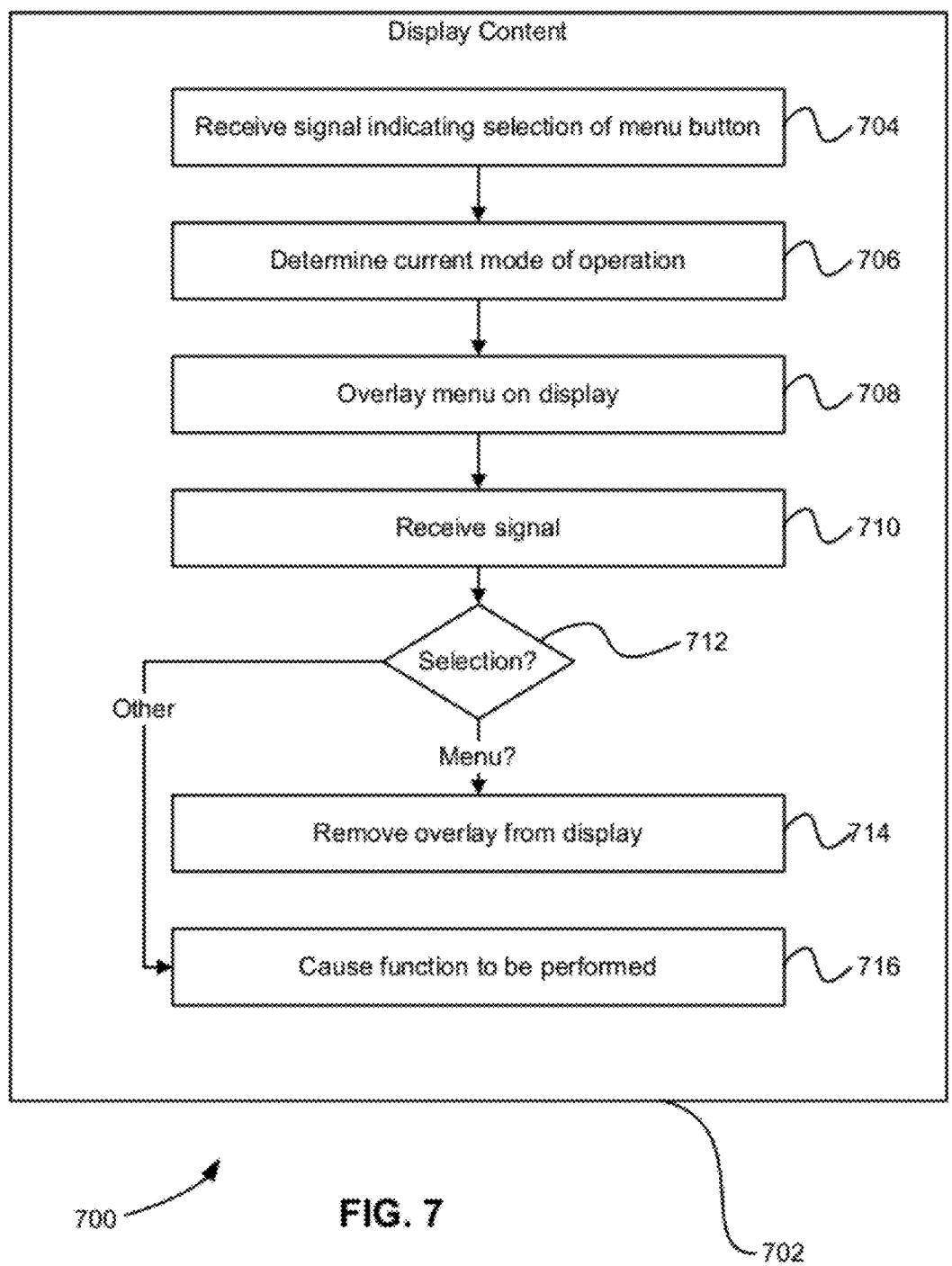
FIG. 7 shows a process for providing a menu in accordance with at least one embodiment.

FIG. 7 shows an illustrative example of a process 700 for providing a menu, in accordance with an embodiment. The term menu may indicate a UI and/or collection of UIs, such as described above. Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. One or more of the actions depicted in FIG. 7 may be performed by a device, such as the display device 100, described above. Further, some or all of the process 700 may be performed collectively by multiple devices, such as a bridge and a display device as described in application Ser. No. 13/077,750, entitled "Apparatus and Method for Configuration and Operation of a Remote-Control System" filed on Mar. 31, 2011, which is incorporated herein by reference for all purposes. The code may be stored on a computer-readable storage medium, for example, in the form of a computer program comprising a plurality of instructions executable by one or more processors. The computer-readable storage medium may be non-transitory.

In various embodiments, the process 700 includes displaying 702 content. As noted, content may be displayed during performance of some or all of the process 700 and, therefore, displaying 702 content is shown as a step that encompasses other actions of the process 700. While other actions may also be performed concurrently with yet other actions, for the purpose of illustration, other actions are not illustrated as such. Displaying 702 the content may be performed in any suitable manner and the content may be any content capable of being displayed including, but not limited to, television content, content from a device such as a DVD or other media device, content streamed over the Internet or another network, electronic photographs, and other content.

In an embodiment, a signal indicating selection from a menu button on a remote control device, such as the remote control device 600 described above in connection with FIG. 6A, is received 704. The signal may be received directly by a display device or indirectly, such as by another device in communication with the display device. As one example, a signal may be received as a result of user interaction with a touch screen interface. While the process 700 is described in connection with a menu button, other actions may be substituted in the process 700, or variations thereof. For example, any suitable button may cause the signal to be received. In an embodiment, many different buttons on a remote control device may cause a menu to appear. The menu that appears may depend on the button pressed. For example, if a user is utilizing an application of a content providing device and presses an EXIT button, an Activity UI may appear. Further, a conventional remote control device need not be used in some embodiments. For instance, a camera may record motions of a user and, if a user makes a particular motion associated with the signal, the signal may be received. In such embodiments, navigation of menus may also proceed using sensed user motions, although such embodiments will not be described in detail. As another example, a remote control or other device may include one or more motion sensors, such as gyroscopic sensors and/or accelerometers. A signal may be sent from such a device responsive to movement of the device, perhaps after a period of not being moved or detecting a particular movement that corresponds to a specific gesture for causing the menu to appear. As an illustrative example, a remote control device may send a signal if one or more sensors collectively indicate, for instance, that the remote control device was picked up by a user.

When the signal is received 704, in an embodiment, a determination of the current mode of operation of the display device (and possibly other devices) is determined 706. The mode of operation may correspond to an activity being performed, such as watching TV, watching a DVD, browsing the Internet, and the like. The mode of operation may also include other information, such as devices that are used to perform the activity. For example, one mode of operation may correspond to watching TV using a STB, another mode of operation may correspond to watching TV streamed from an online source, and yet another mode of operation may correspond to watching TV from yet another source, such as an antenna that is used to receive broadcast signals. The mode of operation may also include information regarding any audio devices used to experience content. Generally, the mode of operation may correspond to any collection of information regarding how a display device is being used to experience content.

The process 700 may also include overlaying 708 a menu on the display, such as described above. The menu appearance may be based at least in part on the determined mode of operation. For example, if it is determined that the current mode of operation corresponds to watching a DVD, a command UI, such as described above, may be overlaid on the display. The command UI may be configured based on a current state of the activity being performed. For instance, if the DVD is paused, a play option may be highlighted. In addition, the various options presented may depend on the state of the activity being performed. If the user is navigating through interactive content of a DVD, the menu may include options that are different from if the user is watching a movie encoded on the DVD. It should be noted that, in some embodiments, a menu may not be overlaid on displayed content. For example, in other modes of operation (e.g., a "play music" activity), the menu may simply appear on the display by itself, rather than as an overlay.

In an embodiment, a signal may be received 710. The signal may be received in any suitable manner, such as pursuant to selection of a button on a remote control device or otherwise. It should be noted that in some instances a signal may not be received at this point and the process 700 may deviate accordingly. For example, if the user does nothing, a timeout may cause the overlaid menu to disappear. The menu may, for example, disappear after a period of time during which no signals are received. Further, in some instances, a signal may not be received, such as if power to a device is lost, a device malfunctions, and the like. It should be noted that, as elsewhere herein, receipt of a signal may actually include receipt of multiple signals; however, for the purpose of illustration, illustrative embodiments are described in terms of a single signal.

When the signal is received, a determination is made 712 regarding a selection corresponding to the signal. For example, if it is determined that the received signal corresponds to selection of a menu button, the overlaid menu may be removed 714 from the display. If, however, it is determined that the received signal corresponds to selection of an option on a currently displayed menu, a corresponding function may be performed. For example, if the option corresponds to an activity, if not already in a suitable state, one or more devices may be put in a suitable state. If the activity is watching a DVD, for example, a DVD player and AVR may be put in a power-on state and configured as necessary to allow the user to watch a DVD. Putting one or more devices may be performed by sending one or more appropriate signals to each device, as necessary to put the devices in the correct state. Appropriate signals may be sent in any suitable manner. For instance, the display device may send signals to the other devices over an HDMI connection, using infrared, or otherwise. As another example, a content appliance such as the Logitech Revue (which may also act as a bridge device) may generate and send appropriate signals. A device generating display information (such as the display device itself or a device providing the generated display information for the display device to display) may communicate with the content appliance or other signal-generating device accordingly. As another example, if the selected option is navigational, the menu display may change according to how the user has navigated. A different option may be highlighted and/or a different menu may be overlaid on the display in addition or instead of a currently-displayed menu. Generally, any suitable function that corresponds to the signal that was received may be performed.

Figure 8:
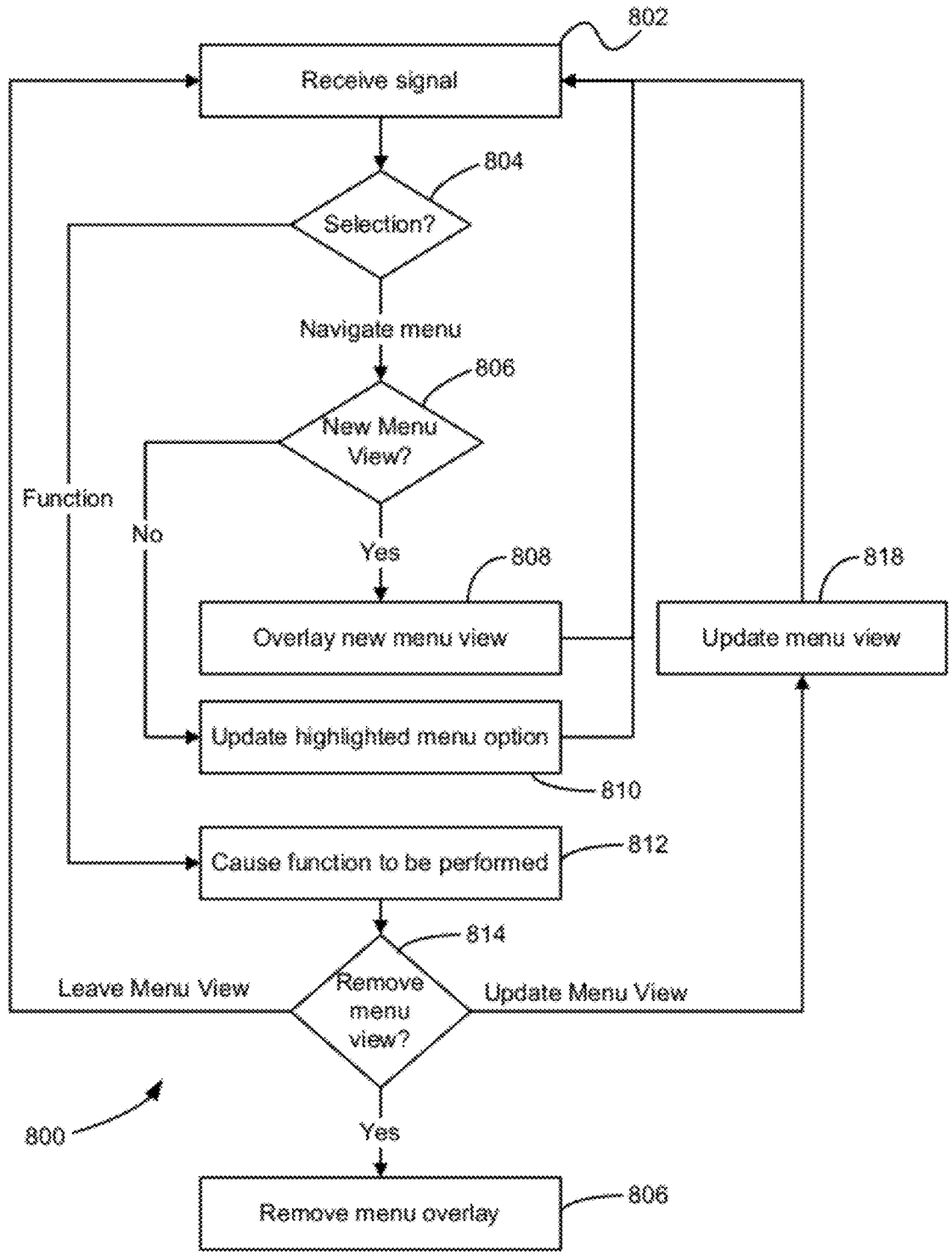
FIG. 8 shows a process for providing user navigation of a menu in accordance with at least one embodiment.

FIG. 8 shows an illustrative example of a process 800 that may be used to update a menu that has presented to a user on a display, such as described above. For example, in an embodiment, the process 800 may be combined with the process 700 described above in connection with FIG. 7 when a signal is received in connection with a displayed menu. In an embodiment, the process 800 includes receiving 802 a signal, such as described above. A determination may be made 804 regarding an action to which the signal corresponds. For example, in this illustrative example, a determination is made 804 regarding whether the signal corresponds to navigation of the menu or selection of a function. If it is determined that the signal corresponds to navigation of the menu, another determination may be made 806 whether a new menu view should be presented, where a new menu view may be, for example, a new UI, such as described above. As just one example, referring to the illustrative example in FIG. 2, if it was determined that the user selected the navigation bar 220, such as by selecting an up arrow on a remote control device when the navigation bar 220 was highlighted, it may be determined that an Activities UI should replace a currently displayed Device UI. If, however, it is determined, for example, that the signal corresponds to navigation from the DVD-1 icon to the AVR icon, or from the DVD-1 icon to the navigation bar 230, it may be determined that a new menu is not required.

Accordingly, in an embodiment, if it is determined 806 that a new menu view is required, a new menu may view may be overlaid 808 on the display. Overlaying the new menu view may include replacing a currently presented menu view although overlaying the new menu can, in some embodiments, include adding a new menu view to a currently displayed menu view. For example, referring to FIG. 2, in an embodiment, selection of the menu bar 220 may cause the Activities UI to replace the Device UI that is currently displayed. However, in some embodiments, the Activities UI may appear in addition to the Device UI, such as above the Activities UI. Returning to the process 800, if it is determined that a new menu view is not required, the currently displayed menu view may be updated 810, such as by highlighting a new menu option. It should be noted that other actions are also possible, such as expanding expandable menu options, displaying contents of a drop-down box, and, generally, updating a current menu view in any suitable manner that corresponds to the signal that was received. Further, if the received signal did not correspond to anything that would require update of the menu view (or a new menu view), the current menu view may be left unchanged.

If it was determined 804 that the signal corresponds to a function to be performed (such as if the user selected a menu option), then, in an embodiment, the function may be performed 812. If a device performing some or all of the process 800 is to perform the function, the device may perform the function itself. If a different device is to perform the function, a signal may be sent to the device to instruct the device to perform the function. As an illustrative example, if a TV is performing the process 800 and the signal corresponds to a function that the TV performs (such as a volume level adjustment if the TV is providing audio), the TV may perform the function. If, however, the TV is performing the process 800 and the function corresponds to a DVD player function (such as pause of DVD playback), a signal may be sent to the DVD player to cause the DVD player to perform the function. The signal may be sent in any suitable manner, such as over an HDMI cable, wirelessly using IR or RF, or in another way.

In an embodiment, when the function is caused to be performed (or if performance of the function has at least been initiated), a determination may be made 814 whether to remove the currently displayed menu view. Some functions may be, for example, unlikely to require use of a menu once performance has been completed or at least initiated while it may be more convenient for some functions to leave a menu view displayed. For instance, subsequent to selection of a fast-forward option, it may be more convenient for the user to leave a menu view displayed to allow the user to resume normal playback once content has reached a desirable position without requiring the user to cause a menu view to appear again. However, subsequent to selection of an application option, it may be more convenient to remove the current menu view to allow the user to utilize the interface of an application that has launched. Generally, each function may correspond to a determination 814 whether to remove the current menu view. The correspondence may be predetermined or may be learned over time, such as based on user behavior or behavior of a collection of users.

Accordingly, if it is determined 814 to remove the menu view, the menu view may be removed 816 from a display, i.e., may be no longer overlaid on the display. As illustrated in FIG. 8, if it is not determined to remove the menu view, it may be determined 814 to update 818 the menu according to the function that as performed or to leave the menu view as it was. Determining whether to update the menu view or leave the menu view unchanged may be based at least in part on the function that was performed. For example, if the function corresponded to selection of a pause option for a movie, the menu may be updated to display a play option instead of the pause option that was selected. If the function corresponded to selection of a volume adjustment, as another example, it may be determined to leave the menu view unchanged. As illustrated, whether or not the menu view is unchanged, the process 800 may repeat in certain circumstances. For example, if a signal is subsequently received, the process 800 may be performed again. Performance of the process 800 may be repeated, for example, as long as a user navigates menu views and/or until an event, such as a timeout, causes all menu views to disappear from the display.

As noted, presentations of menus may vary based at least in part on context. FIG. 9, accordingly, shows an illustrative example of a process 900 that may be used to provide a menu when a particular activity is being performed. In an embodiment, the process 900 includes receiving 902 a signal, which may be a signal that indicates that a menu should be overlaid on a display, such as described above. Upon receipt of the signal, in an embodiment, the current activity is determined 904. For example, a determination may be made whether the activity is watching a movie, watching television, playing a game, interacting with an application, and the like. As above, while not illustrated as such, the determination may be more complex and may include determining what devices are being used and other relevant information.

The process 900, in an embodiment, also includes determining 906 a current state of the activity that is being performed. For example, if the activity is watching a movie, the state may be whether the movie is playing or paused. If the activity is playing a game, the state may be whether the game is being played or is paused, a level of the game currently being played, and the like. Generally, the state may be any collection of information about how an activity is currently being performed. In an embodiment, a menu is determined 908 based on the current activity. A data store that associates activities with menus may be accessed to make the determination. The menu may be determined additionally based on the state of the activity and/or other information. For example, each activity/state pair of a set of possible activity/state pairs may correspond to a particular menu. (Some menu/state pairs may correspond to the same menu.) Determining the menu may be performed in such an embodiment by identifying the menu from a data store that associates activities, states, and menus.

In an embodiment, the process 900 includes determining 910 an option of the determined menu to highlight. The determination may be made based at least in part on the determined state. For example, if the activity is watching television and the state is that content corresponds to a commercial break, a determination may be made to highlight an option for changing a channel or, if a DVR is available for such use and the current state is that the current content is pre-recorded on the DVR, it may be determined to highlight a fast-forward button to allow the user to fast-forward through the commercial break. Generally, any suitable manner of determining the option to highlight may be used. When the option to be highlighted is determined, in an embodiment, the determined menu with the highlighted option is provided 912. Providing the menu may be performed in any suitable manner, such as by overlaying the menu on a display, sending information to a display device to enable the display device to overlay the menu, and the like.

FIG. 10 shows an illustrative example of a process 1000 for determining an option to highlight, which may be part of the process 900 described above in connection with FIG. 9 in a specific circumstance, i.e. when a movie is being watched. In an embodiment, the process 1000 includes determining 1002 a current activity such as watching a movie. A determination is then made 1004 whether the state of watching the movie is that the movie is playing or the movie is paused. It should be noted that the process 1000 is simplified for the purpose of illustration and that other states may be possible. If it is determined 1004 that the state is that the movie is playing, a highlighted option is set 1006 to a pause option. If, however, it is determined 1004 that the state is that the movie is paused, a highlighted option may be set to a play option. As noted above, a menu with the determined option highlighted may be presented in manner that results in a menu with the highlighted option being overlaid on a display. In this manner, a user is able to immediately select "play" when a movie is paused and immediately select "pause" when the movie is playing. Therefore, in many instances, the user is allowed to select an option without unnecessary navigational steps.

Figure 11:
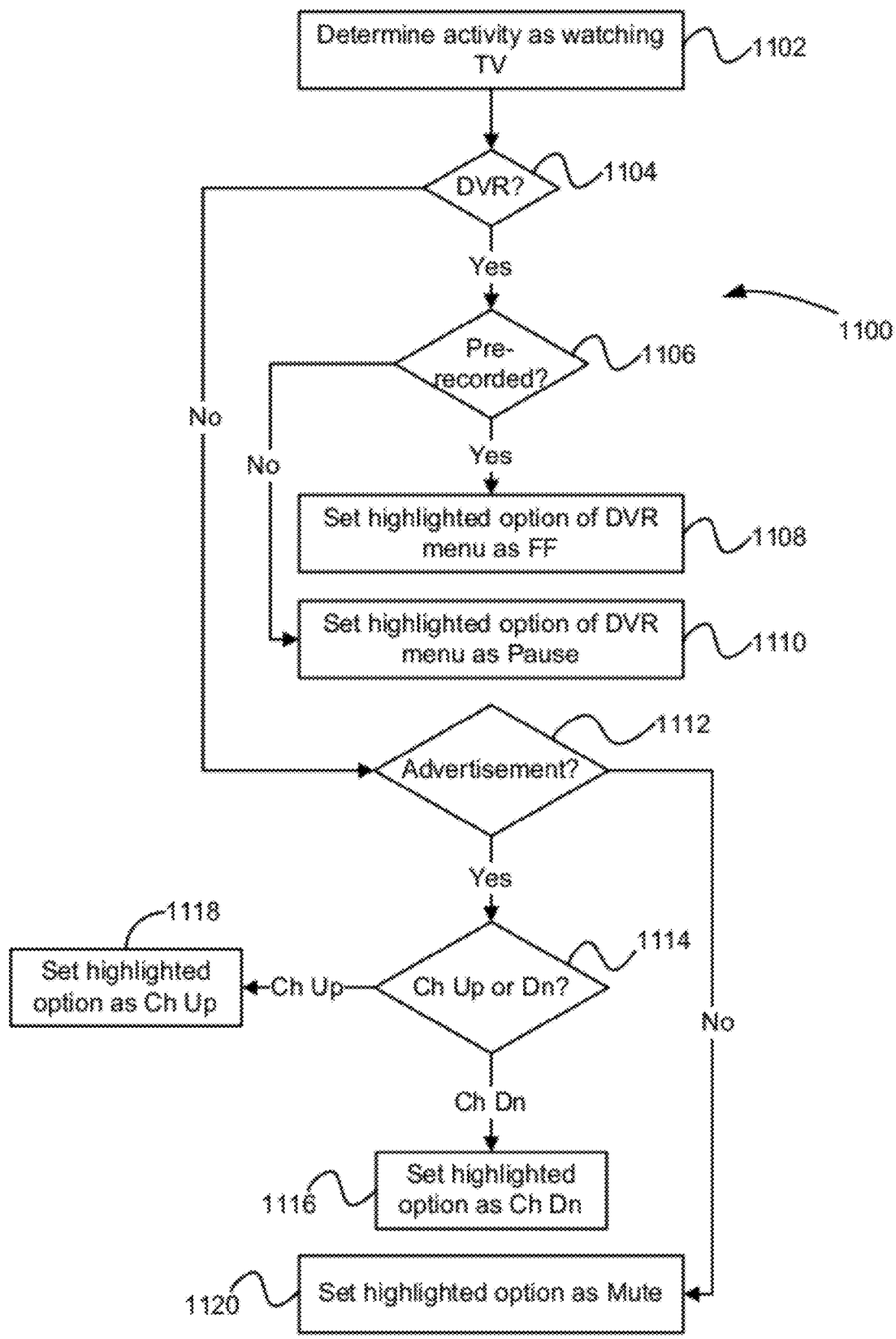
FIG. 11 shows a process for determining a highlighted menu option when television content is currently being watched, in accordance with at least one embodiment.

FIG. 11 shows an illustrative example of a process 1100 for determining an option to highlight, which may be part of the process 900 described above in connection with FIG. 9 in a specific circumstance, i.e. when a movie is being watched. In this example, the process 1100 includes determining 1102 the current activity as watching television. A determination may be made 1104 whether a DVR is being used and/or is available for use. If it is determined 1104 that a DVR is being used and/or available for use, a determination may be made 1106 whether the current content being displayed is pre-recorded or live, where pre-recorded indicates that the content is being played from memory of the DVR rather than, for example, a STB or an antenna. If it is determined 1106 that the content being watched is pre-recorded, the highlighted option of a DVR menu may be set 1108 to fast-forward. It should be noted that, while not illustrated as such, the process 1100 may include determining which menu to display, such as described above. If, however, it is determined that the content being watched is not pre-recorded, the highlighted option may of a DVR menu be set 1110 to a pause option.

In an embodiment, if it is determined 1104 that a DVR is not used or available for use, a determination may be made whether the current content is an advertisement 1112. The determination may be made in any suitable manner. For example, a content provider, such as a satellite television provider, a broadcast television provider, and the like, may incorporate signals into their broadcasts that identify whether current content is an advertisement. Such signals may be used to make a determination. Other techniques may also be used to determine whether current content is an advertisement. For instance, image recognition techniques may be used to compare one or more screenshots with one or more screenshots of known advertisements in a remote or other database. If a screenshot matches an image in such a database, a determination may be made that the current content is an advertisement. The Internet or other communications network may be used to access such a database and screenshots may be downsampled to decrease latency. Further, screenshots may be periodically checked against a remote database so that, at the point a determination needs to be made, a recent screenshot has already been compared. As with other actions discussed herein, a determination whether current content is an advertisement may be made at a time different from that which is implied by the illustrative example of the figure. Of course, any suitable technique to make the determination may be used.

If it is determined that the current content is an advertisement, in an embodiment, a determination is made 1114 whether to highlight a "channel up" option or a "channel down" option (or another option, such as a "last channel watched" option). The determination may be based at least in part on the current state of the activity. For example, if the currently watched channel corresponds to a high number, the determination may be to highlight the channel down option. Similarly, if the currently watched channel corresponds to a low number (such as the first channel in a sequence of channels), the determination may be to highlight the channel up option. The determination may also be based at least in part on recorded user behavior. For example, channels watched by a user (or group of users, such as a household) may be recorded. If more channels that the user typically watches are below the current channel, the determination may be made to highlight the channel down option. Factors such as the time spent on each channel, the time of day the channel is currently watched, and the current time may be factored into a determination.

In the illustrative example of FIG. 11, once it has been determined whether to highlight the channel up option or the channel down option, the channel down option is set 1116 to be highlighted 1116 or the channel up option is set 1118 to be highlighted according to the determination. If however, it has been determined that the current content is not an advertisement, in an embodiment, a different option is set to be highlighted. For example, as illustrated in FIG. 11, in an embodiment, a mute option is set 1120 to be highlighted. Of course, the particular determinations and options set to be highlighted are provided for the purpose of illustration and different embodiments may perform the process 1100 in a different manner, with different options.

Figure 12:
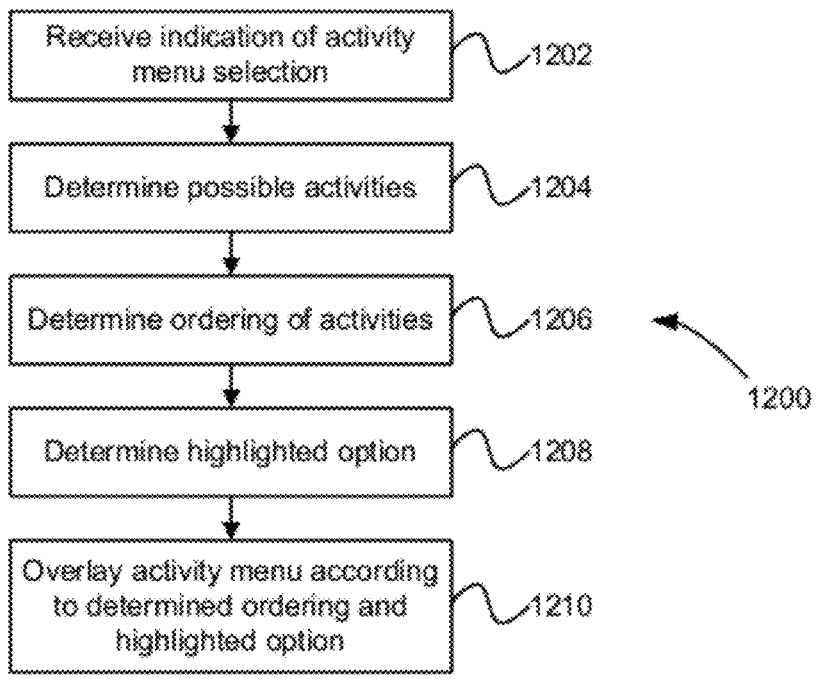
FIG. 12 shows a process of providing a menu of activities shows a process for determining a highlighted menu option when a movie is currently being watched, in accordance with at least one embodiment.

FIG. 12 shows an illustrative example of a process 1200 for providing an activity menu, such as the Activity UI described above. In an embodiment, the process 1200 includes receiving an indication of an activity menu selection by the user. For example, the user may have navigated to an Activity UI, as described above. As another example, a user may have selected the menu button on a remote control device, such as described above, and a corresponding signal may have been received. As a result of the signal being received, context may have been used to determine that an activity menu should be displayed in response to the user having selected the menu button.

In an embodiment, a set of possible activities is determined 1204. The set of possible activities may be determined in any suitable manner. For example, a set of activities may be a set of activities that a user has configured through a configuration process. A set of activities may also be determined based at least in part on what activities are possible based on a set of devices that are available for use with activities. For example, if a DVD player is not available to play a DVD, the determined set of activities may exclude watching a DVD. Determining a set of activities may also include selecting a subset of a larger set of activities. For example, if a menu can only display some number of a larger number of possible activities, the set may be determined by selecting from the possible activities.

As illustrated in FIG. 12, an ordering for the determined set of activities may be determined 1206. The ordering may be based at least in part on various information available, such as recorded user behavior, time of day, and the like. For example, the activities may be ordered based at least in part on records regarding activities that have been selected in the past. For example, the activities may be ordered based at least in part on a recorded frequency of selection over a time period. The frequency may be measured for a particular part of the day and the ordering may be based at least in part on a frequency for a current time of day. In addition, past user behavior may be used to order the activities. As one example, if a user frequently watches a particular television program on Thursdays at 9:00 PM, a Watch Television Activity may occur first (or near first) in a determined ordering. Of course, other methods for ordering the activities may be used, including alphabetical ordering, random ordering, and/or other methods.

Also illustrated in FIG. 12, the process 1200 may include determining an activity to highlight. For example, it may be determined to highlight the first of an ordered set of activities. It should be noted that the first of an ordered set of activities may not necessarily correspond to the first in a list of activities as the list appears on a menu. For example, if a set of activities is to be displayed as sequence of icons on a menu, the first in the ordering may correspond to a prominent position in the sequence (such as the middle) and not necessarily the leftmost activity. The determination may also be made in other ways, such as described above. For example, a determination may be made as to the activity that the user is most likely to select, which may be made based at least in part on past recorded behavior of the user and/or of a group of users. Once all applicable determinations have been made, in an embodiment, the activity menu may be overlaid 1210 on a display according to the ordering with the highlighted option, such as described above.

Figure 13:
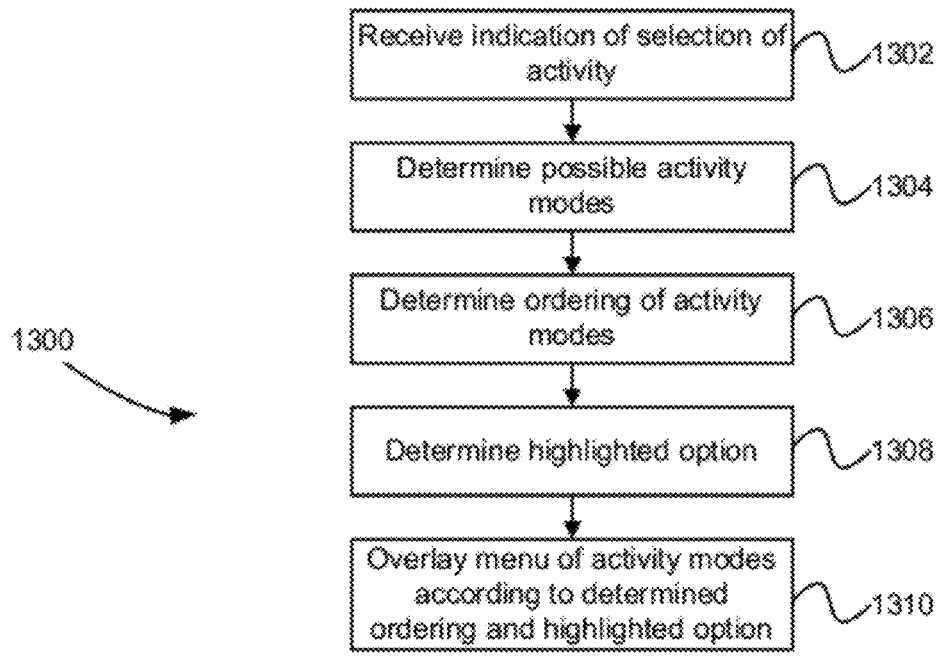
FIG. 13 shows a process for providing a menu when a user has selected an activity, shows a process for determining a highlighted menu option when a movie is currently being watched in accordance with at least one embodiment.

In some instances, when a user selects an activity option of a menu, there may be several options for performing that activity. Television content, for example, can be obtained from various devices, such as satellite STBs, cable STBs, fiber optic STBs, antennas, remote servers, etc. FIG. 13, accordingly, shows an illustrative example of a process 1300 that may be used when a user selects an activity of a menu, such as an Activity UI, as described above. In an embodiment, the process 1300 includes receiving 1302 an indication of selection of an activity by a user, such as described above. A determination may be made 1304 of the possible modes of the activity that were selected. For example, if the user selects a Watch TV option, a determination may be made as to the possible content sources for television content. Similarly, if the user selects a Watch a Movie option, a determination may be made regarding how the user can watch a movie (e.g., using a DVD player, a Blu-Ray player, a video streaming service, an online subscription service such as Netflix®, movies currently playing in a television broadcast, movies pre-recorded on a DVR, and the like. Sources of movie content may include accessible metadata, such as tags, that may be used to identify the content as a movie). The determination may be made based at least in part on one or more devices in communication with a device being used in connection with performance of the process 1300. For example, if an Internet connection is not currently available, a video streaming service mode may be excluded from a set of possible activity modes. As with other determinations, the determination, in some embodiments, does not need to be made responsive to selection of an activity, but may have been made in a background process prior to user selection of the activity in order to improve UI responsiveness.

In an embodiment, the determined modes for the selected activities are ordered 1306, such as in a manner described above and a determination is made 1308 as to which option to highlight. As with other processes described above, once all appropriate determinations have been made, a menu of activity modes may be overlaid 1310 on a display with the appropriate highlighted option. The menu may replace a menu of activities, such as the Activity UI above, or may be presented in other ways.

Figure 14:
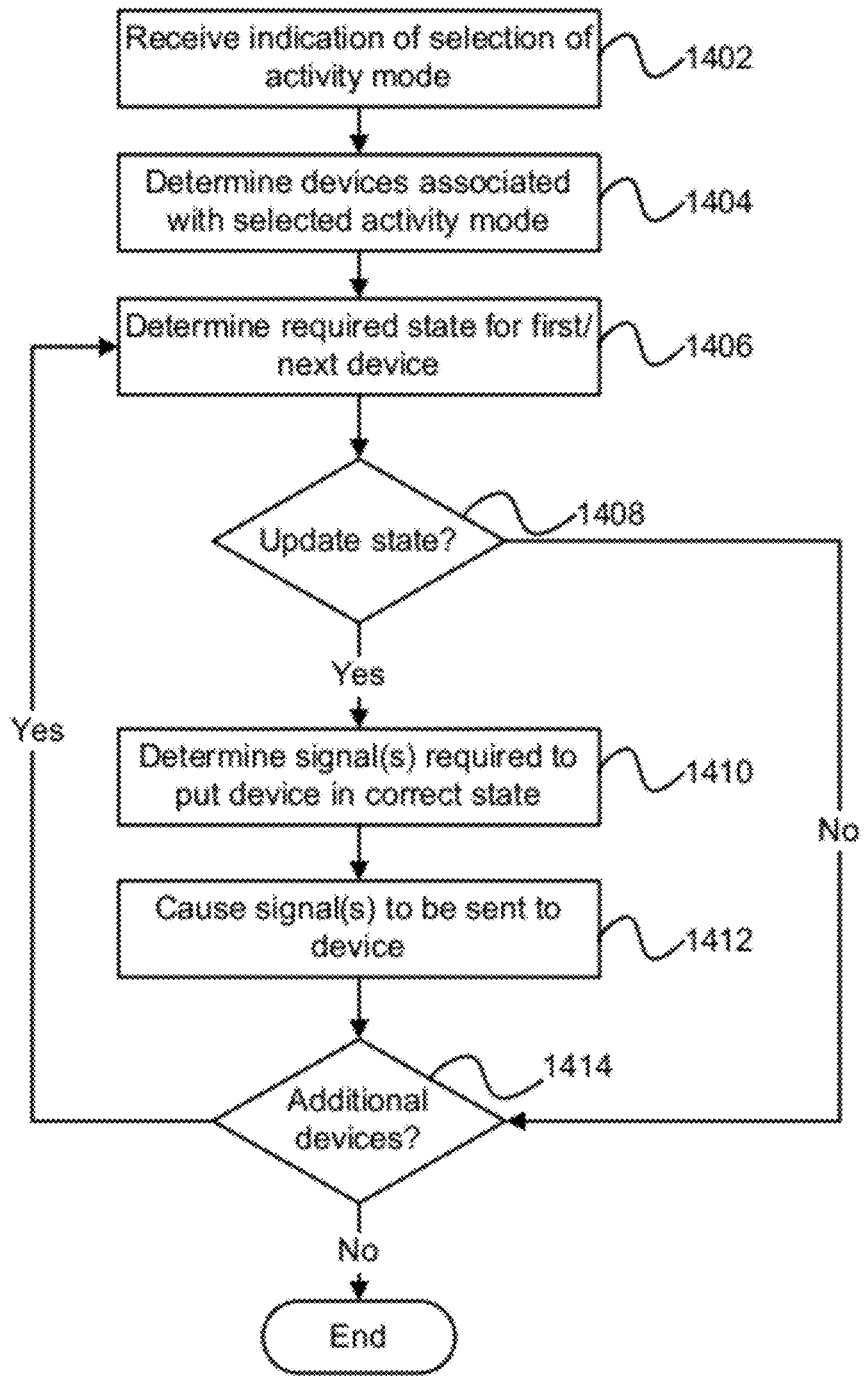
FIG. 14 shows a process for operating at least a subset of a set of devices in response to user selection of an activity, shows a process for determining a highlighted menu option when a movie is currently being watched in accordance with at least one embodiment.

As with any menu described herein, a menu option may be selected by a user. FIG. 14 accordingly shows an illustrative example of a process 1400 that may be performed when a user selects a mode of an activity, such as in connection with the process 1300 of FIG. 13 described above. It should be noted that, in some embodiments, an activity mode may be selected in other ways. For example, some activities may have only one mode for a given configuration and, selecting the activity mode may be performed by virtue of selecting the corresponding activity.

As illustrated in FIG. 14, in an embodiment, an indication of selection of an activity mode is received 1402, such as in a manner described above. As discussed, a mode of an activity may correspond to use of a plurality of devices, such as an AVR, a DVD player, a STB, a TV, and/or other devices. Accordingly, in an embodiment, the process 1400 includes determining 1404 a set of devices associated with the selected activity mode. For instance, if the selected activity mode corresponds to watching a DVD, the set of devices may include a TV, a DVD player, and possibly an AVR or other system for providing audio.

In an embodiment, the selected activity mode may require each of the determined devices to be in a particular state. For instance, watching a DVD may require a TV to be set to an input corresponding to a DVD player. The DVD player may need to be put into a state where the DVD player reads content from a DVD. An AVR, if used, may need to be put in a state where audio signals are received form the DVD player. Accordingly, in an embodiment, the process 1400 includes determining a required state for a first device for the selected activity mode. A determination may then be mode 1408 whether to update the state of the device. The determination may be made in any suitable manner. For example, the state of the device can be tracked as a user utilizes various devices and determined based on a tracked state of the device. Whether to change the state of the device can be determined by communicating with the device, such as through an HDMI cable connected to the device. In addition, determining whether to change the state of the device can be made by, for example, assuming that the device is in a particular state and determining whether the particular state differs from the state the device needs to be in. For example, the determination may be made for a DVD player by assuming that the DVD player is in a power-off state.

When it is determined whether to update the state of the first device, in an embodiment, one or more signals are determined 1410 for putting the device in the proper state. For example, a signal corresponding to a power-on state may be determined. If more than one signal is needed to put the device in the correct state, multiple signals may be determined. In any event, one or more signals may then be transmitted 1412 to the device for which the signals were intended. The device may receive the signal and change state accordingly, but not necessarily so. For example, a DVD player already in a power-on state may do nothing upon receipt of a power-on signal.

A determination may then be made whether there are additional devices and portions of the process may be performed again until all devices are put into the correct state, as illustrated in the figure. It should be noted that, as with all processes described herein, variations are considered as being within the scope of the present disclosure. For example, the process 1400 may include determining all signals required to put devices in the proper state before sending all of the determined signals to the respective devices.

Generally, other variations are also considered as being within the scope of the present disclosure. For example, FIGS. 2-5 provide illustrative examples of menu layouts for the purpose of illustration. Generally, layouts may differ substantially from that which is illustrated. In an embodiment, a UI is designed such that every supported device or activity is visible as a menu option, and such that navigation steps to reach an option are, at least in some instances, minimized. For instance, in an embodiment, menu options can be scrolled through continuously in either direction (i.e. as a "carousel"). The sequence of device menus (TV—STB—AVR—DVD) may be arranged as a carousel that is defined such that the minimum of steps are required to manual engage into an activity such as watching live TV or watching a movie. The number of menu options may be minimized. For instance, in an embodiment, the UI only presents only three items (devices commands) at most when a group of commands is selected in order to minimize the TV real estate occupied by the UI, although different numbers may be used in different embodiments. Cues that more items are available in the list may be provided, such as icons, labels, color gradients, font colors, and the like. When a user navigates to a group of device commands, the menu of commands may, in some instances, automatically appear without the user pressing the "OK" button or otherwise actively making a selection. When a cursor or other indication of immediately selectable option is in a menu of commands, in an embodiment, the user can proceed to the next group of commands by simply moving left or right (no need to scroll down and back to the main menu line). When navigating to a group of commands, the UI element representing the group may be replaced with the most frequently used command in order to minimize the number of steps. When opening up a group of device commands, the cursor or other indicator of an immediately selectable option may automatically moves to the most frequently used command, e.g. "Guide" for a "Live TV" group in a STB menu.

Further, embodiments of the present disclosure also allow for menu customization by a user. For instance, a setup process may be invoked (either initially or at some later time) to allow a user to customize UI presentations. During such a setup process, the user may be able to change the order of groups and commands in a device menu or the order of commands within a menu. The same could be done from a settings menu. The order of command within a group may be ordered alphabetically by default, or based on the most common order in the population of users (crowd sourcing), and the like. The order of commands within a group and/or he order of groups & commands within a menu may be optimized automatically based on the usage tracking of a specific user, in order to minimize travel when navigating the UI. At various time, the user may be able add a currently watched television channel or other content source indicators to a maintained list of favorites by pressing and holding a dedicated menu button on his/her remote control device, or by taking some other action. At various times, the user may be able to add a URL of a currently viewed web page to a list of shortcuts by pressing and holding the dedicated menu button on his/her remote. At various times the user may be able to add the application (currently in focus or running) to the list of shortcuts by pressing and holding the dedicated menu button on his/her remote. Other variations in addition to those explicitly described herein are also considered as being within the scope of the present disclosure.

In addition, embodiments of the present invention further include computer-readable storage media that include program instructions for performing various computer-implemented operations as described herein. The computer readable medium is any data storage device that can store data which can thereafter be read by a electronic system. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as flash drives, hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The computer readable medium can also be distributed over a network coupled to electronic systems so that the computer readable code is stored and executed in a distributed fashion.

Other variations include, but are not limited to, variations on the hardware used to implement various embodiments of the present disclosure. For example, as discussed above, a bridge device may be used to receive signals form a remote control device based on user interaction with the remote control device and transmit signals to one or more other consumer electronic devices accordingly. Bridge devices may be configured in numerous ways. For example, in various embodiments, a bridge device has a single video input and a single video output to a display device. In this embodiment, the bridge device may receive a video signal through the video input and output a video signal accordingly. Instead of the display device overlaying menus on the display, the bridge device may modify the video signal to cause the display device to display menus generated in accordance with various embodiments. In this manner, the display device does not require computing logic for generating and displaying menus other than to decode the incoming video signal. As another example, the bridge device may include multiple video inputs and one or more video outputs. The bridge device may select from the inputs for receipt of a corresponding incoming video signal. Selection of the input may be made according to user input with a remote control device. For example, if a user selects a "Watch DVD" activity using a remote control device, the bridge device may select an input that receives a signal from a DVD player. A outgoing video signal may be sent to a display device accordingly and the outgoing video signal may be modified to overlay various menus on the display.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A remote control system, comprising:
  a controller including a plurality of fixed-function buttons and permanently configured to output a plurality of command signals corresponding to the plurality of buttons; and a hub, said hub including one or more processors; and
memory including instructions that, when executed by the one or more processors, cause the remote control system to at least:
determine a menu that includes one or more options for controlling at least one consumer electronic device from a set of consumer electronic devices;
in response to receipt of an indication of user intent to view the menu, including one or more of the command signals from the controller, cause the determined menu to appear on a display of a device that is different from the consumer electronic device;
receive one or more of the command signals corresponding to user interaction with the displayed menu; and
when the user selects an option of the menu for controlling the consumer electronic device, causing a signal to be transmitted to the consumer electronic device, the signal being configured to cause the consumer electronic device to change state according to the selected option,
wherein, each of the plurality of buttons is permanently configured to activate its corresponding command signal regardless of the state of the consumer electronic device.

2. The remote control system of claim 1, wherein the device that is different from the consumer electronic device is a television.

3. The remote control system of claim 1, wherein causing the determined menu to appear on the display includes modifying the display such that the menu is overlaid atop content of the display.

4. The remote control system of claim 1, wherein the menu includes at least one selectable option for a function that is incapable of being selected using a dedicated input of the remote control device.

5. The remote control system of claim 1, wherein determining the menu is based at least in part on a current state of the consumer electronic device.

6. The remote control system of claim 1, wherein the menu further includes one or more options for controlling at least one other device.

7. The remote control system of claim 6, wherein the other device is a television.

8. A remote control configuration system, comprising:
a display device including:
a video display;
a processor configured to interact with a remote control;
a communication apparatus configured for communicating with at least one other device;
wherein, the processor is further configured to:
present a user interface including selectable commands on the display;
receive a set of predetermined commands from the remote control;
interpret at least one of the predetermined commands as a navigation command in one context and as a received command in another context;
communicate the received command to the at least one other device; and
modify the user interface based on the navigation command.

9. The system of claim 8, wherein the user interface is determined based at least in part on the state of a set of devices that includes at least one other device different from the display device.

10. The system of claim 8, wherein the display device is a TV.

11. The system of claim 8, wherein the processor is further configured to make an inference of relevant activities for the other device based on a current mode of operation of the display device.

12. The system of claim 11, wherein the selectable commands presented by the user interface depend at least on a determination of whether the other device is currently in use.

13. The system of claim 8, wherein the processor is further configured to at least one of activate and update the user interface for the other device based on automated network communication with a remote service provider.

14. The system of claim 8, wherein the user interface is configured to allow a user, while watching the display device operating in a first mode of operation, to launch an application operable in a second mode of operation.

15. The system of claim 8, wherein the user interface is configured to allow a user, while viewing content on the display device, to accept content-related commands for the other device, and to communicate the content-related commands to the other device, the content-related commands communicated to the other device including at least one data element with information based on the content.

16. The system of claim 8, wherein the user interface is configured to detect a current operational state of the other device and to change the user interface for the other device based on the operational state of the other device.

17. The system of claim 8, wherein the user interface includes a user-selectable and user-definable search feature that is operable to search at least one of content stored on the other device, content available from a remote on-demand service, and a scheduled programming service.

18. A method of controlling a peripheral device via a display device comprising:
controlling the display device via a hub to present a first user interface including a plurality of selectable options;
while presenting the first user interface on the display device, receiving a control signal via the hub and interpreting the control signal as a selected option of one of the plurality of selectable options;
communicating, based at least in part on the selected option, commands from the hub to the peripheral device;
while not presenting the first user interface on the display device, receiving the control signal via the hub and interpreting the control signal as a peripheral device command; and
communicating the peripheral device command from the hub to the peripheral device.

19. The method of claim 18, wherein presenting the user interface on the display device is based at least in part on the state of a set of devices that includes the peripheral device, the peripheral device being different from the display device.

20. The method of claim 18, further comprising changing the selectable options based at least in part on a current mode of operation of the display device.

21. The method of claim 20, wherein:
the display device includes selectable modes of operation including at least three of tuner, AV, HDMI, S-Video, web-streaming, and web browsing modes;
the current mode of operations is selected from the modes of operation; and
different selectable commands are displayed in the user interface based on the at least three modes of operation.

22. The method of claim 18, further comprising automatically determining whether the peripheral device is ON or OFF, and only presenting the first user interface for the peripheral device if the peripheral device is ON.

23. The method of claim 18, further comprising automatically determining whether the peripheral device is in use and making an automated inference of relevant activities for the peripheral device based on a current mode of operation of the display device.

24. The method of claim 18, wherein the selectable options presented by the first user interface depend on the determination of whether the peripheral device is currently in use.

25. The method of claim 18, further comprising at least one of activating and updating the first user interface for the peripheral device based on an automated network communication with a remote service provider.

26. The method of claim 18, further comprising allowing a user, while watching the display device operating in a first mode of operation, to launch an application operable in a second mode of operation.

27. The method of claim 18, further comprising:
receiving from a user, while the display device is displaying content, content-related commands for the peripheral device; and
communicating the content-related commands to the peripheral device, the content-related commands communicated to the peripheral device including at least one data element with information based on the content.

28. The method of claim 18, further comprising detecting a current operational state of the peripheral device and changing the first user interface for the peripheral device to a second user interface based on the operational state of the peripheral device.

29. The method of claim 18, further comprising presenting, as part of the first user interface, a user-selectable and user-definable search feature that is operable to search at least content stored on the peripheral device, content available from a remote on-demand service, and a scheduled programming service.

30. A method of controlling a set of one or more consumer electronic devices comprising:
under the control of a set of one or more controlling components of a remote control system,
determining a menu that includes one or more options for controlling at least one consumer electronic device from the set of consumer electronic devices;
causing the determined menu to appear on a display of a device that is different from the consumer electronic device;
receiving one or more signals corresponding to user interaction with the displayed menu, the signals having been generated remotely from the device having the display; and
when the user selects an option of the menu for controlling the consumer electronic device, causing a signal to be transmitted to the consumer electronic device, the signal being configured to cause the consumer electronic device to change state according to the selected option;
wherein the set of one or more controlling components include a remote control device and a bridge device, the remote control device including a plurality of fixed-function buttons and permanently configured to output a plurality of command signals corresponding to the plurality of buttons regardless of the state of the consumer electronic device;
the received one or more signals are generated by the remote control device according to user interaction with the remote control device; and
the bridge device generates and transmits the signal to the consumer electronic device.

31. The method of claim 30, wherein the display displays content according to a video signal from the bridge device and wherein causing the determined menu to appear on the display includes modifying the video signal.

32. The method of claim 31, wherein the bridge device includes a plurality of video inputs, wherein the video signal is based at least in part on a signal received through a particular video input of the plurality of video inputs, and wherein the bridge device is configured to select from the plurality of video inputs based at least in part on user input to the remote control device.

33. The remote control system of claim 1, wherein the hub is configured to interpret at least one of the command signals as a navigation command, which causes navigation of the displayed menu, in one context, and as a received command, that instructs an operation of the at least one consumer electronic device, in another context.

* * * * *